United States Patent

[11] 3,569,939

[72] Inventors Anton H. Doblmaier
Summit, N.J.;
Randall W. Downing, Wheaton, Ill.;
Michael P. Fabisch, Bronx, N.Y.; John A. Harr, Geneva; John S. Nowak, Wheaton; Frank F. Taylor, West Chicago; Werner Ulrich, Glen Ellyn, Ill.

[21] Appl. No. 685,351
[22] Filed Nov. 24, 1967
[45] Patented Mar. 9, 1971
[73] Assignee Bell Telephone and Laboratories, Incorporated
New York, N.Y.
Division of Ser. No. 334,875, Dec. 31, 1963.

[54] PROGRAM CONTROLLED DATA PROCESSING SYSTEM
19 Claims, 7 Drawing Figs.

[52] U.S. Cl. .......... 340/172.5
[51] Int. Cl. .......... G05b 19/00
[50] Field of Search .......... 340/172.5, 146.1; 235/157

[56] References Cited

UNITED STATES PATENTS

| | | | |
|---|---|---|---|
| 3,140,464 | 7/1964 | Rakoczi et al. .......... | 340/146.1 |
| 3,156,897 | 11/1964 | Bahnsen et al .......... | 340/172.5 |
| 3,254,329 | 5/1966 | Lukoff et al. .......... | 340/172.5 |
| 3,268,871 | 8/1966 | Handler et al. .......... | 340/172.5 |
| 3,319,226 | 5/1967 | Mott et al. .......... | 340/172.5 |

*Primary Examiner*—Paul J. Henon
*Assistant Examiner*—R. F. Chapuran
*Attorneys*—R. J. Guenther and R. B. Ardis

ABSTRACT: Improvements in data processor systems to increase data handling capabilities and to conserve memory space. The improvements are accomplished by parallel execution of independent data processing actions, by providing single cycle execution of functions which customarily require several program steps, and by optimizing the use of instruction code space and data space in memory.

Patented March 9, 1971 3,569,939

6 Sheets-Sheet 1

INVENTORS A H DOBLMAIER
R W DOWNING
M P FABISCH
J A HARR
J S NOWAK
F F TAYLOR
W ULRICH

BY John C Albrecht
ATTORNEY

Patented March 9, 1971 3,569,939

6 Sheets-Sheet 4

PROGRAM CONTROLLED DATA PROCESSING SYSTEM

Cross-References To Related Applications

This is a division of copending application, Ser. No. 334,875, filed Dec. 31, 1963, and relates to a program controlled data processing system wherein there is a requirement for substantially continuous and uninterrupted operation.

Background Of The Invention

Program controlled data processors, which include both general purpose computers and special purpose computers, are employed in many industrial applications in which it is essential that the machine perform a prescribed amount of work within a prescribed period of time. Systems employed in such applications are commonly referred to as "real time" and "near real time" systems.

A telephone switching system is an example of a "near real time" system in that it must serve the demands of the lines and trunks terminating in the office without unreasonable delays.

Most program controlled data processors do not operate as efficiently as might be possible since most data processing a tasks are preformed in series. The instruction repertoire of a computer is usually divided into several groups of instructions, and certain hardware is associated with each particular group. It is generally true that whenever a particular instruction is executed within the processor only the hardware associated with the current instruction type is being used while the remainder of the hardware may be idle. Therefore, the efficiency of a particular piece of hardware, as calculated on the basis of its use versus its availability, is quite low.

It is an object of this invention to increase the overall efficiency of a program controlled computer and to increase the efficiency of memory.

Summary Of The Invention

In accordance with this invention a program controlled data processor is organized to optimize the number of data processing jobs which can be performed in a given period of time. The central processor of such a program controlled data processing system meets the objectives of the invention by increased utilization of the circuitry available, and by the addition of special purpose circuits. The optimization is accomplished by options on program instruction words which allow one instruction to execute two unrelated independent actions in the machine, and by providing circuitry which allows the completion of a multiinstruction data processing job by one instruction in one machine cycle.

It is a feature of this invention that any selected information bit in a particular register may be updated in one operational step.

It is another feature of this invention that the time allocated for execution of an instruction under certain conditions is extended without interfering with the execution of the next succeeding instruction in the current sequence of instructions.

It is still another feature of this invention that selected instruction words are provided with options which cause the instruction word to perform two nonrelated functions (e.g., insert data in an index register in addition to storing the contents of the accumulator in memory).

It is another feature of this invention that the index adder circuit may be used for general data processing functions.

General Description

Figure 1:
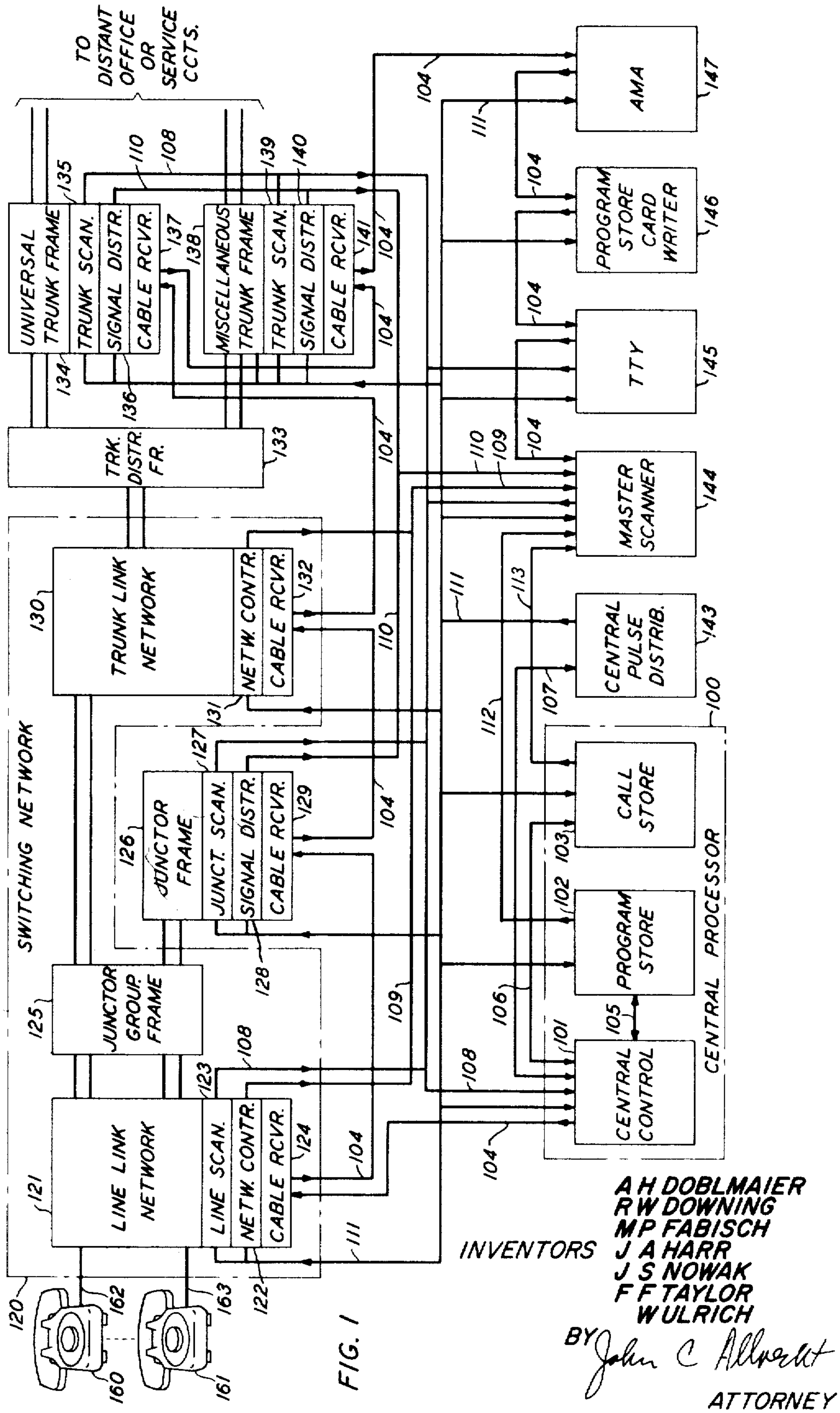
FIG. 1 is a general block diagram of a telephone switching system.

The organization of an electronic telephone switching system as employed herein to illustrate the improvements of this invention is shown in FIG. 1.

Shown in FIG. 1 are the Telephone Subscriber Stations 160 and the Switching Network 120 for interconnecting telephone subscriber stations and for connecting telephone subscriber stations to the Trunk Distribution Frame 133. From the Trunk Distribution Frame 133 connections may be made to outgoing trunks or to the service circuits of the system of by way of circuits of both the Universal Trunk Frame 134 and the Miscellaneous Trunk Frame 138. The Switching Network 120 and the Trunk and Junctor Frames 126, 134, 138 are controlled by the Central Pulse Distributor 143 which is in turn controlled by the Central Processor 100. The Master Scanner 144, Line Scanner 123, Junctor Scanner 127, and Trunk Scanners 135 and 139 are provided to interrogate the operational states of their associated equipments under commands from the Central Processor 100. The Teletypewriter 145 (TTY) provides for direct communication with the system; the Automatic Message Accounting Unit 147 (AMA) records the necessary data required for the accounting of telephone calls made through the office; the Program Store Card Writer 146 is provided to insert information in the semipermanent Program Store 102.

Figure 2:
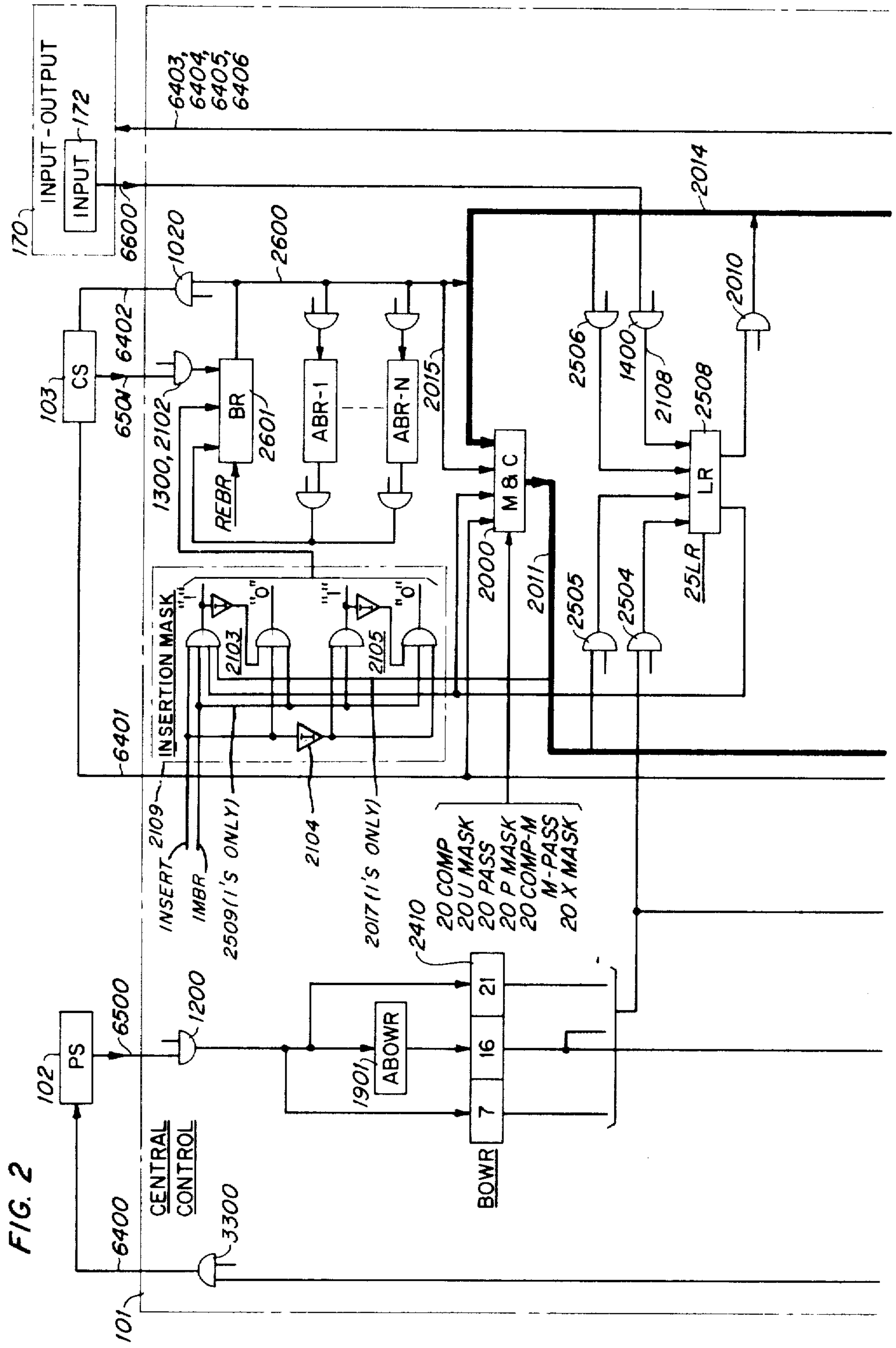
FIGS. 2 through 4, arranged as shown in FIG. 7, comprise a detailed block diagram of the central processor of the illustrative system.
Figure 3:
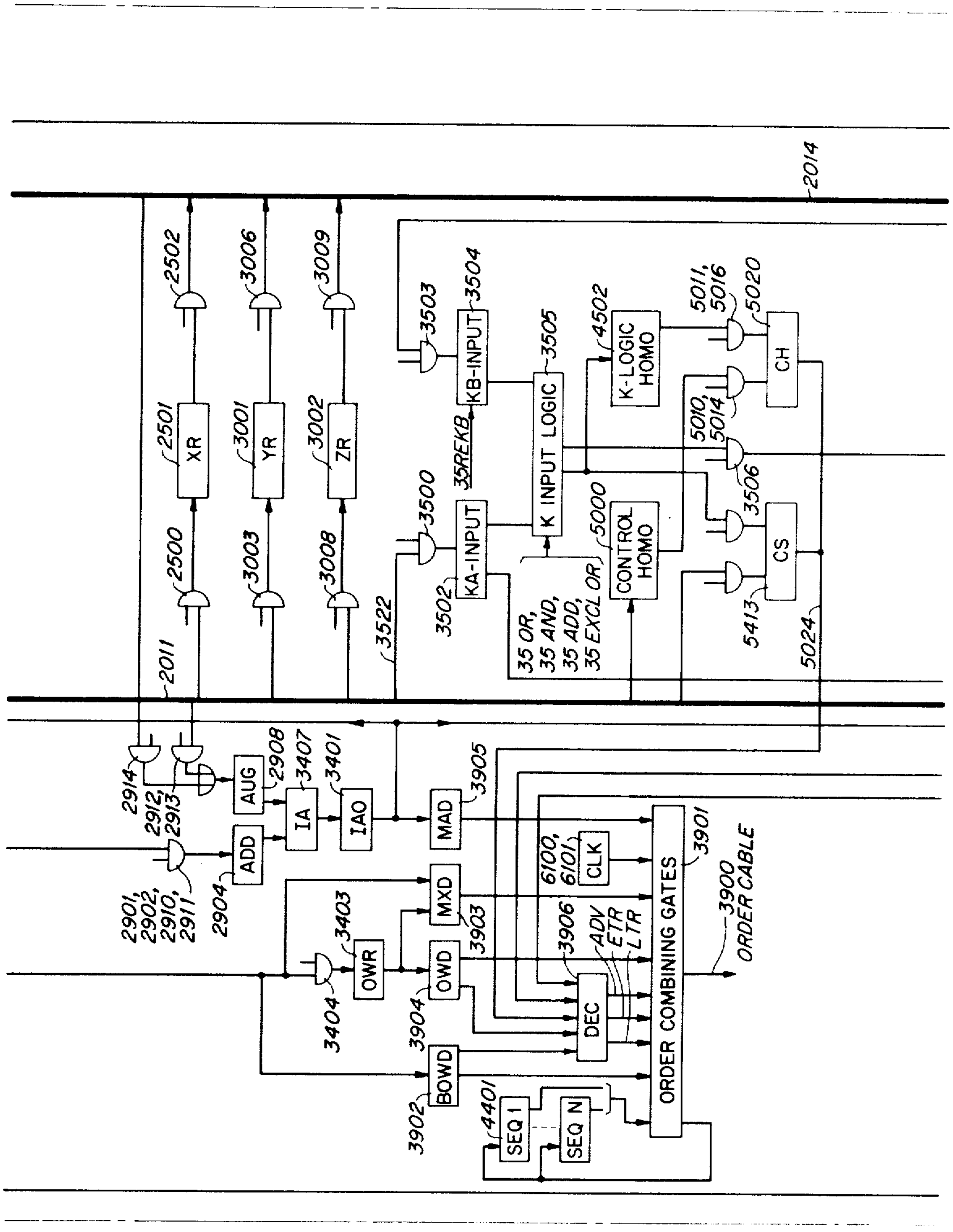
Figure 4:
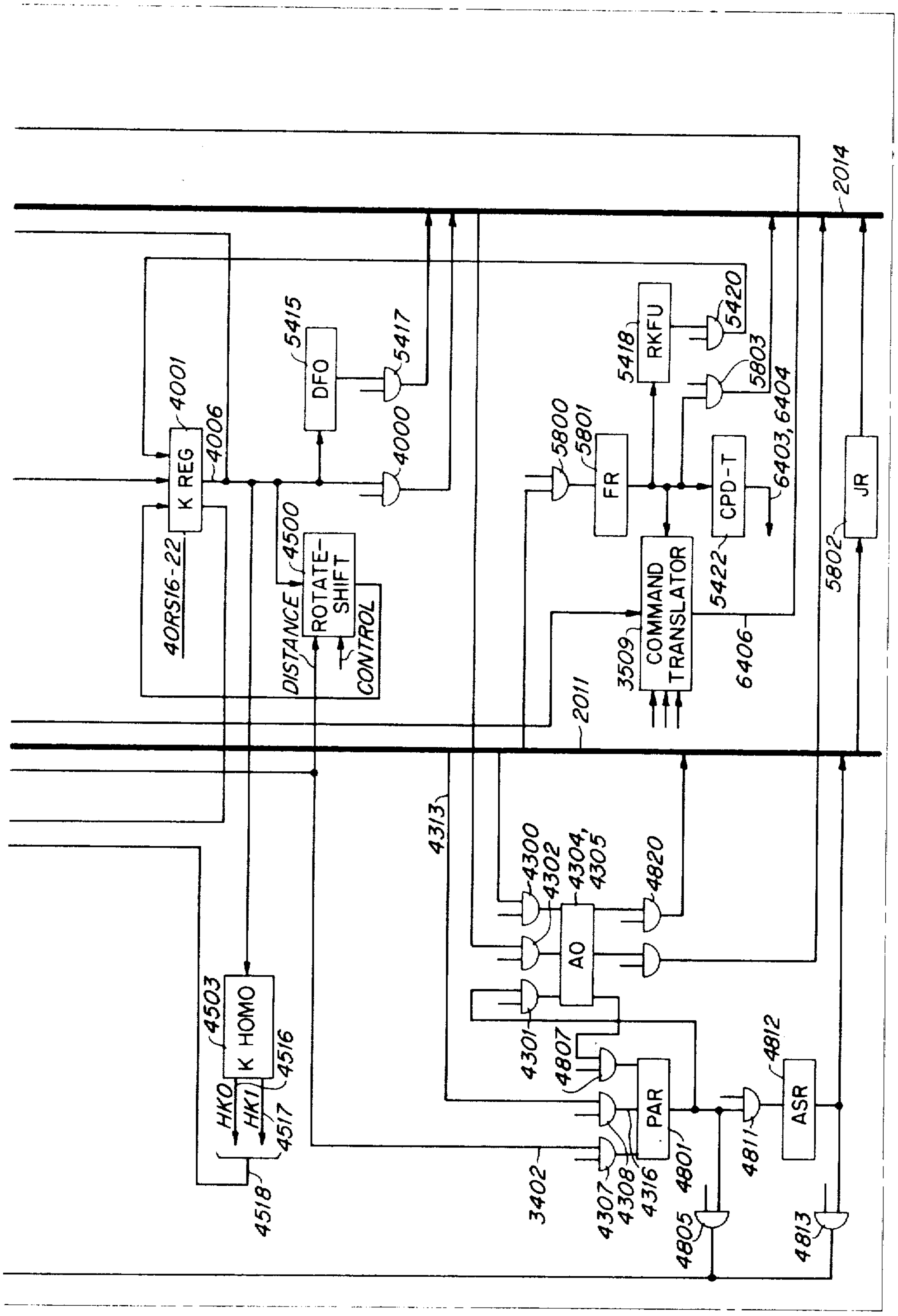
Figures 6, 7:
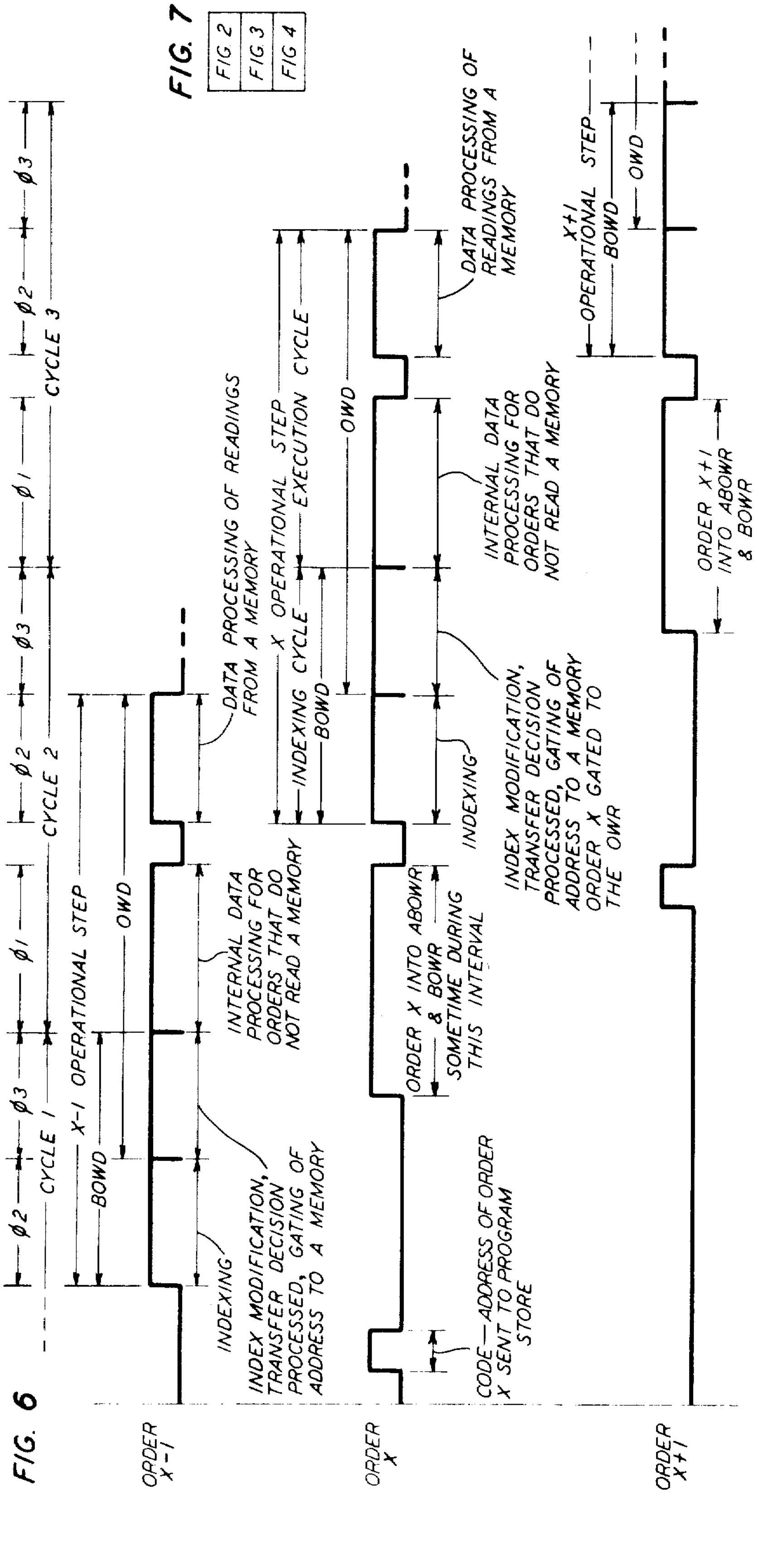
FIG. 6 is a time diagram which illustrates the processing of the three successive program orders in the central processor of FIGS. 2 through 4.
FIG. 7 is a key FIG. showing the arrangement of FIGS. 2 through 4.

The Central Processor 100 is shown in greater detail in FIGS. 2, 3 and 4, arranged as shown in FIG. 7. All of the equipment shown in FIG. 1 other than the central processor is represented in FIG. 2 by a box labeled Input-Output 170. Similarly, the two memory units of the central processor, the Program Store 102 and the Call Store 103, are each represented by a single box in FIG. 2. The remainder of FIG. 2 and FIGS. 3 and 4 comprise the block diagram of Central Control 101. The Central Control 101 obtains its instruction order words from the Program Store 102, which is a random access word-addressable memory. An address for reading the Program Store 102 is gated from the Program Address Register 4801 (PAR) or from the Auxiliary Storage Register 4812 (ASR) to the Program Store 102 via the Program Address Bus 6400. Instruction words from the Program Store 102 are received in the Auxiliary Buffer Order Word Register 1901 (ABOWR) and the Buffer Order Word Register 2410 (BOWR). Some decoding is performed by the Buffer Order Word Decoder 3902 (BOWD) while the instruction is in the Buffer Order Word Register 2410. Further decoding is performed by the Order Word Decoder 3904 (OWD) and the Mixed Decoder 3903 (MXD) after the instruction word is transferred from the Buffer Order Word Register 2410 to the Order Word Register 3403 (OWR). In the Order Combining Gates 3901 the outputs of the various decoders of the Central Control 101 are combined with certain present-state indications within the Central Control 101 and with clock pulses to generate the gating pulses required for the execution of an instruction.

The Call Store 103 is used by the processor as a scratch pad memory. Addresses for this memory are generated in the Index Adder 3407 and are gated to the Call Store 103 via the Call Store Address Bus 6401. When data is read from the Call Store 103 it is received in the Buffer Register 2601 (BR); and when data is to be written into the Call Store 103 the data is gated from the Buffer Register 2601.

A number of index registers (e.g., the X Register 2501) are located between two internal buses of the Central Control 101. Data may be gated from an index register onto the Unmasked Bus 2014, and may be gated into an index register from the Masked Bus 2011. The two buses are separated by a Mask and Complement Circuit 2000 in which the data may be modified as it is transferred from the Unmasked Bus 2014 to the Masked Bus 2011. The Central Control 101 contains an accumulator arrangement consisting of the K Register 4001, the KA Input 3502, the KB Input 3504, and the K Input Logic 3505.

Several operations are performed simultaneously within the central control by virtue of a 3-cycle overlap operation. FIG. 6 indicates the simultaneous operations which take place with regard to the execution of three successive order words.

Specific circuitry is provided for consolidation of the several operational steps required for inserting new data in selected bits of a register without disturbing the remaining bits. The Insertion Mask Circuit 2109 shown in FIG. 2 is a representative of the circuitry required for each bit of the register into which data is to be selectively inserted. The insertion masking operation inserts new data into selected bits of the Buffer Register 2601 (BR) which is a buffer for communications with the Call Store 103. By the use of the insertion masking operation a data word may be read from memory into the Buffer Register 2601 during a first machine cycle; during a following machine cycle date may be transferred from a specified location in the central processor, inserted into the Buffer Register 2601, and the modified data word may be written into memory from the Buffer Register 2601. The information as to which bits of the Buffer Register 2602 are to receive the new data is contained in the Logic Register 2508 (LR). The contents of the Logic Register 2508 are presented to the Insertion Mask Circuit 2109 simultaneously with new data which appears on the Masked Bus 2011.

Shown in FIG. 2, and connected by bus to the Buffer Register 2601, are a group of auxiliary registers labeled ABR–1 through ABR–N. These registers comprise control and monitor circuits for the central processor. The method of updating and extracting information from these registers is unique in that these registers are addressed by a memory type address code. These registers are advantageously so addressed in order to reduce the amount of code space which would be required if these registers were treated or addressed as index registers of the central processor. This arrangement further facilitates the altering of a selected bit of a selected register by the use of the combination of the Insertion Mask Circuitry 2109 and the Buffer Register 2601.

Shown in FIG. 3 are a group of Sequencing Circuits 4401 labeled SEQ–1 through SEQ–N. Selected ones of these circuits are employed to introduce overlap of instructions by controlling gating operations within the Central Control 101. These circuits control the execution of a previous instruction after a new instruction has been entered in the machine and is in the process of being decoded by the Decoders 3902 through 3905 of the Central Control 101. As previously noted, the electronic telephone switching system of FIG. 1 is employed to illustrate the improvements of this invention. The detailed description that follows is not that of a complete telephone switching system; but, rather, that of a reduced system. The description is limited to those details which enhance the understanding of the improvements.

COMMUNICATION BUSES AND CABLES

Communications between major divisions of this system are by way of bus systems and by way of multiple conductor cables which provide discrete communication paths between selected divisions of the system. The buses and cables are detailed later herein.

Communication within a major division of this system, such as a Central Control 101, may be by way of bus systems; however, such internal bus systems comprise a plurality of single rail parallel paths and are not intended to be covered by the following discussion.

A bus system, as defined herein, comprises a plurality of pairs of conductors which may, in many respects, be compared to a tapped delay line. The time delay of a bus system is not necessarily an advantageous aspect of the bus system but, rather, is an inherent characteristic thereof. A bus is a transmission means for transferring information from one or more sources to a plurality of destinations. A bus is transformer coupled to both the information source or sources and to the destination loads. The information sources are connected to the bus conductors in parallel and the loads are coupled to transformers which are serially connected in the bus conductors. Dual winding load transformers are employed and the two windings of the pair of windings are connected in series with the individual conductors of a pair of conductors of a bus. The load is lightly coupled to the bus as are the taps of a delay line and the bus is terminated in its characteristic impedance also in a manner well known in the manufacture of delay lines.

A bus system is connected to a number of equipments which may be physically separated by distances which are large compared to the distances between taps of a normal delay line. Data transmitted over a bus is in pulsed form and in this particular embodiment extremely short pulses in the order of one-half microsecond are transmitted. Information on a bus system is transmitted in parallel, that is, a data word or command is transmitted in parallel over the plurality of pairs of conductors of the bus and it is important that such parallel data elements arrive at a given load equipment at a common time. Accordingly, the pairs of conductors of a bus system are arranged to follow similar physical paths and their lengths are kept substantially identical.

Although the buses of this illustrative embodiment are shown in the drawing to be a single continuous path from a source to one or more destinations, there are, in fact, many special techniques employed to minimize propagation time from an information source to a destination point and to equalize propagation times between an information source and similar destinations. Such techniques are not discussed herein as they are not essential to an understanding of this invention.

In addition to the bus systems there are a plurality of multiple conductor cables which provide discrete communication paths between selected divisions of the switching system. The conductor pairs of these cables are in many instances transformer coupled both to the information source and the destination load; however, there are also a number of cables wherein DC connections are made to both the source and the destination load.

While a bus is a unidirectional transmission means, there are specific instances wherein a cable pair comprises a bidirectional transmission means.

The multiple conductor cables generally provide unduplicated paths between the selected divisions of the system while, as previously noted, the buses of a bus system generally provide duplicated paths between selected divisions of the system.

SWITCHING NETWORK (120)

The Switching Network 120 serves to selectively interconnect through metallic paths lines to lines via junctor circuits, lines to trunks, trunks to trunks, lines and trunks to tones, signal transmitters, signal receivers, maintenance circuits, and, in the case of lines, to provide connections to coin supervisory circuits, etc. Two-wire paths between the above enumerated equipments are provided through the network of this one specific illustrative embodiment.

The Switching Network 120 only provides communication paths, means for establishing such paths and means for supervising such paths. The Central Processor 100 maintains a record of the busy and idle states of all network links and a record of the makeup of every established or reserved path through the network. These records are maintained in the Call Store 103 of the Central Processor 100. The record relating to the busy-idle states of the network elements is generally referred to as the Network Memory Map. The Central Processor 100 interprets requests for connection between specific pieces of equipment and determines a free path through the network by examining the connection requirements and the above-noted busy-idle states of the possible paths.

The network is divided into two major portions, namely, line link networks which terminate lines and junctors (both wire junctors and junctor circuits) and the trunk link networks which terminate trunks and wire junctors, service circuits such as tone circuits, signal receivers, signal transmitters, etc. A line link network comprises four switching stages, the first two stages of which are concentrating stages, while a trunk link network comprises four stages generally without concentration. In this one specific illustrative embodiment there is a single path provided between a line and each of a plurality of line link network junctor terminals. There are four paths through a trunk link network between a trunk terminal and each of a plurality of trunk link network junctor terminals.

Certain junctor terminals of each line link network are connected directly through wire junctors (a pair of wires without other circuit elements) to certain junctor terminals of the trunk link networks; others of the line link network junctor terminals are interconnected either by way of junctor circuits (which provide talking battery and call supervision facilities) or, in very large offices, by way of junctor circuits and additional stages of switching.

Junctor terminals of a trunk link network which are not connected to junctor terminals of a line link network are directly interconnected by wire junctors or, in extremely large offices, by way of wire junctors and additional switching stages.

Control of the network and the control and supervision of the elements connected to the network are distributed through a number of control and supervisory circuits. This distribution provides an efficient and convenient buffer between the extremely high speed Central Processor 100 and the slower network elements. The principal control and supervisory elements are:

1. The new network control circuits which accept coma commands from the Central Processor 100 and, in response to such commands, selectively establish portions of a selected path through the network or, in response to such commands, execute particular test or maintenance functions.

2. The network scanners which comprise a ferrod scanning matrix to which system elements such as lines, trunks and junctor circuits are connected for purposes of observing the supervisory states of the connected elements; the network scanners, in response to commands from the Central Processor 100, transmit to the Central Processor 100 indications of the supervisory states of a selected group of circuit elements.

3. The network signal distributors which, in response to commands from the Central Processor 100, provide an operate or a release signal on a selected signal distributor output terminal which is termed herein a signal distributor point. A signal of a first polarity is an operate signal and a signal of the opposite polarity is a release signal. Signal distributor output signals are employed to operate or release control relays in junctor circuits, trunk circuits, and service circuits. A magnetically latched wire spring relay is used generally throughout the junctor circuits and trunk circuits for purposes of completing the transmission paths through these elements and for circuit control in general. The magnetically latched relay operates in response to an operate signal (−48V.) from a signal distributor and releases in response to a release signal (+24V.) from a signal distributor. The network signal distributors are relatively slow operating devices in that they comprise pluralities of relays. Signal distributor output signals are pulsed signals and a single signal distributor can be addressed to only one of its output points at any given instant.

Of the three above-noted network control and supervisory elements (there are pluralities of each of these) the network controllers and the signal distributors are relatively slow operating devices and to assure completion of a task, each of these devices is addressed at the maximum repetition rate of once every 25 milliseconds. This period of time is sufficient to assure completion of the work function associated with a network controller or signal distributor command. Therefore, there is not need for the Central Processor 100 to monitor these devices to assure completion of their assigned tasks before transmitting a subsequent command to the same controller. However, to assure continued trouble free operation scan points which reflect the successful completion of a preceding order are examined before sending a new command to the controller. The network scanners, however, are relatively fast operating devices and these may be addressed at a maximum rate of once every 11 microseconds.

SUBSCRIBER CIRCUITS

The subscriber sets such as 160, 161 are standard sets such as are employed with present day telephone switching systems. That is, these are sets which connect to the central office via a two-wire line, respond to normal 20 cycle ringing signals and may be arranged to transmit either dial pulses or TOUCH-TONES or may be arranged for manual origination. Subscriber stations comprising one or more subscriber sets such as 160, 161 all terminate at line terminals of a line link network. A subscriber line may have either TOUCH-TONE sets or dial pulse sets or combinations of TOUCH-TONE and dial pulse sets. Information concerning the type of call signaling apparatus associated with a subscriber's line is included in the class of service mark which is maintained normally in the Program Store 102; however, after a recent change this information is found in whole or part in the call store 103.

Supervision of a subscriber's line is by way of the line scanners which are located in the vicinity of a line link network. Such scanners, however, are generally employed only to detect requests for service. After a request for service has been served and a subscriber's line has been connected through the network to a trunk or to a service circuit such as a subscriber's dial pulse receiver, subscriber's TOUCH-TONE receiver, a tone source, etc., or to another subscriber via a junctor circuit, the scanning element associated with a subscriber's line is disconnected and subsequent supervision for answer and disconnect is transferred either to the trunk, the service circuit, or the junctor circuit. The subscriber's line scanning element is reconnected only after the subscriber's line has been released from the prior connection.

Service circuits such as subscriber call signaling receivers and subscriber information tone sources such as busy tone, ringing tone, ringing induction tone, recorded announcements, vacant level tone, etc. are terminated at trunk terminals of the trunk link network. Connections between a subscriber's station and a service circuit such as a dial pulse receiver or a TOUCH-TONE receiver and connections between a subscriber's set and a tone source include the four stages of a line link network and the four stages of a trunk link network.

Communication with a distant office or an operator is by way of two-way trunks, outgoing trunks, incoming trunks, operator trunks, etc., which are located in the Trunk Frames 134, 138 and which all terminate at trunk terminals of a trunk link network. In the case of a call between a subscriber's station and a trunk or service circuit, talking battery to the subscriber is provided through the trunk or service circuit and supervision for disconnect is accomplished by scanning the scanning elements of the connected trunk or service circuit.

The trunk circuits, tone circuits and the other circuits such as TOUCH-TONE receiver, dial pulse receiver, MF transmitter and MF receiver, are all greatly simplified in comparison to their present day counterparts. This simplification is brought about by the use of magnetic latching relays and the control of these through a signal distributor under command of the Central Processor 100. As will be seen later herein in the description of the trunk circuits and the service circuits which terminate on a trunk link network, the control of these circuits is greatly simplified through circuit standardization.

CENTRAL PULSE DISTRIBUTOR (143)

The Central Pulse Distributor 143 is a high speed electronic translator which provides two classes of output signals in response to coma commands from the Central Processor 100. The two classes of output signals are termed unipolar signals and bipolar signals and are respectively associated with central pulse distributor output terminals designated CPD unipolar points and CPD bipolar points. Both classes of signals cǒmprise pulses transmitted from the CPD output points to the using devices via individual transmission pairs which are transformer coupled both to the CPD output points and to the load devices.

The Central Pulse Distributor 143 is an electronic device; therefore, its output signals are employed to control other relatively high speed circuits. For example, central pulse distributor output signals are employed to control the sending of both multifrequency signals and dial pulses from a switching center to a distant office via a trunk circuit and central pulse distributor output points are also employed to set or reset control flip-flops in a variety of system equipments. Generally these control flip-flop must be set or reset at speeds which approach a basic system instruction cycle; therefore, the slow speed signal distributor output signals are not adequate.

MASTER SCANNER (144)

The Master Scanner System 144 comprises a ferrod matrix for terminating circuits to be supervised and means for selectively transmitting to Central Control 101 the supervisory states of a selected group of supervised circuits in response to a command from the Central Processor 100. The scanning element employed is the ferrod device. A ferrod comprises an apertured stick of ferromagnetic material having control, interrogate, and readout windings. The control windings are placed in series with electrical connections which indicate the supervisory state of the supervised circuit. For example, where a ferrod is employed to supervise a subscriber's line, the ferrod is placed in series with the line conductors and the subscriber's subset. When the subscriber's subset is in the onhook state here is no current flowing in the ferrod control winding, while when the subscriber is in the offhook state current does flow in the ferrod control winding. The interrogate and readout windings merely comprise individual conductors which thread through the two apertures of the ferrod, that is, both the interrogate conductor and the readout conductor are threaded through both apertures of the ferrod. An interrogate signal comprising a bipolar pulse which when applied to the interrogate conductor causes an output signal in the readout conductor of every ferrod which is supervising a circuit which is in the onhook state. If the ferrod is supervising a circuit in the offhook state, a readout pulse is not generated due to saturation of the ferrod.

CENTRAL PROCESSOR (100)

The Central Processor 100 is a centralized data processing facility which comprises:

1. Program Store 102;
2. Call Store 103;
3. Central Control 101.

Program Store (102)

The Program Store of the Central Processor comprises a plurality of independent memory units which are passive in the absence of commands from the Central Control.

In the illustrative embodiment, the Program Store is a permanent magnet-magnetic wire memory (Twistor) which affords nondestructive readout of the information stored therein in response to response to commands from the Central Control 101. The Program Store, being semipermanent in nature, is employed to store certain system data which is changed only at relatively long intervals and the system programs. Information is written into the Program Store by means of the Program Store Card Writer 146 (FIG. 1) under commands from the Central Control 101.

Call Store (103)

The Call Store of the Central Processor comprises a plurality of independent memory units.

The Call Store, like the Program Store, is passive in the absence of commands from the Central Control.

In the illustrative embodiment, a word organized ferrite sheet memory is employed as the memory element of the Call Store 103. The Call Store is a destructive readout type memory and information may be read from or written into this memory in a time cycle which corresponds to the time cycle of the Central Control 101. The Call Store, being temporary in nature, is employed to store the system data which is subject to rapid change in the course of processing calls through the system.

Central Control (101) FIGS. 2—4

The central control performs system data processing functions in accordance with program orders which are stored principally in the Program Store 102. The program orders are arranged within the memories in ordered sequences. The program orders fall into two general classifications, namely, decision orders and nondecision orders.

Decision orders dictate that a decision shall be made in accordance with certain observed conditions and the result of the decision causes central control to advance to the next order of the current sequence of order words or to transfer to an order in another sequence of order words. The decision to transfer to another sequence may be coupled with a further determination that the transfer shall be made to a particular one of a plurality of sequences. Decision orders are also termed conditional transfer orders.

Nondecision orders are employed to communicate with units external to Central Control 101 and to move both data from one location to another and to logically process the data in accordance with certain defined instructions. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 10 101 is arranged to perform certain minor arithmetic functions. The arithmetic functions are generally not concerned with the processing of data but, rather, are primarily employed in the process of fetching new data from the memories such as from the Program Store 102, the Call Store 103, or particular flip-flop registers within the Central Control 101.

The Central Control 101, in response to the order word sequences, processes data and generates and transmits signals for the control of other system units. The control signals which are called commands are selectively transmitted to the Program Store 102, the Call Store 103, the Central Pulse Distributor 143, the Master Scanner 144, the network units such as the Network Scanners 123, 127, 135, 139, Network Controllers 122, 131, Network Signal Distributors 128, 136, 140, and the miscellaneous units such as the Teletype Unite 145, the Program Store Card Writer 146, and the AMA Unit 147.

The Central Control 101 is, as its name implies, a centralized unit for controlling all of the other units of the system. A Central Control 101 principally comprises:

A. A plurality of multistate multistage flip-flop registers;

B. A plurality of decoding circuits;

C. A plurality of private bus systems for communicating between various elements of the central control;

D. A plurality of receiving circuits for accepting input information from a plurality of sources;

E. A plurality of transmitting circuits for transmitting commands and other control signals;

F. A plurality of sequence circuits;

G. Clock sources; and

H. A plurality of gating circuits for combining timing pulses with DC conditions derived within the system.

The Central Control 101 is a synchronous system in the sense that the functions within the Central Control 101 are under the control of a multiphase Microsecond Clock 6100 which provides timing signals for performing all of the logical functions within the system. The timing signals which are derived from the Clock 6100, 6101 are combined with DC signals from a number of sources in the Order Combining Gate Circuit 3901. The details of the Order Combining Gate Circuit 3901 are not shown in the drawing as the mass of this detail would merely tend to obscure the inventive concepts of this system.

Sequence of Central Control Operations

All of the system functions are accomplished by execution of the sequences of orders which are obtained from the Program Store 102 or the Call Store 103. Each order of a sequence directs Central Control 101 to perform one operational step. An operational step may include several logical operations as set forth above, a decision where specified, and the generation and transmission of coma commands to other system units.

The Central Control 101 at the times specified by phases of the Microsecond Clock 6100 performs the operational step actions specified by an order. Some of these operational step actions occur simultaneously within Central Control 101, while others are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into ½ microsecond periods which are initiated at ¼ microsecond intervals.

The basic machine cycle for purposes of designating time is divided into ¼ microsecond intervals, and the beginning instants of these intervals are labeled TO through T22. The major phases are labeled phase 1, phase 2, and phase 3. These phases occur in a 5.5 microsecond machine cycle as follows:

A. Phase 1 — T0 to T8,

B. Phase 2 — T10 to T16,

C. Phase 3 — T16 to T22.

Figure 5:
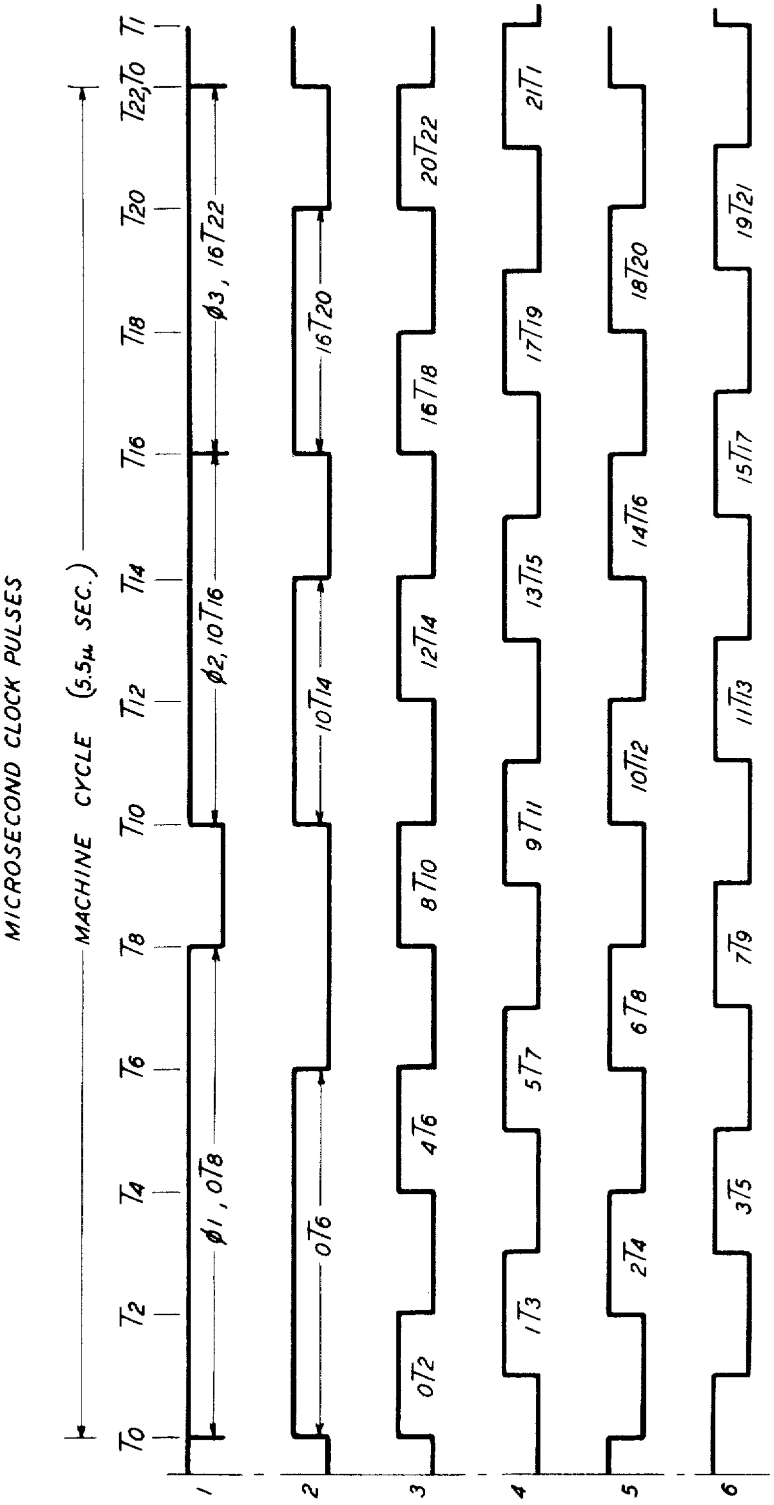
FIG. 5 is a time diagram showing the fundamental timing pulses employed in the central processor of FIGS. 2 through 4.

For convenience in both the following description and in the drawing, periods of time are designated *b*T*e* where *b* is the number assigned the instant at which a period of time begins and *e* the number assigned the instant at which a period of time is ended. For example, the statement 10T16 defines phase 2 which beings at time 10 and ends at time 16. The division of time is shown in FIG. 5.

In order to maximize the data processing capacity of Central Control 101 three cycle overlap operation is employed. In this mode of operation central control simultaneously performs:

A. The operational step for one instruction;

B. Receives from the Program Store 102 the order for the next operational step; and C. Sends an address to the Program Store 102 for the next succeeding order.

This mode of operation is illustrated in FIG. 6. Three cycle overlap operation is made possible by the provision of both a Buffer Order Word Register 2410, an Order Word Register 3403 and their respective decoders, the Buffer Order Word Decoder 3902 and the Order Word Decoder 3904. A Mixed Decoder 3903 resolves conflicts between the program words in the Order Word Register 3403 and the Buffer Order Word Register 2410. The Auxiliary Buffer Order Word Register 1901 absorbs differences in time of program store response.

The initial gating action signals for the order X (herein designated the indexing cycle) are derived in the Buffer Order Word Decoder 3902 in response to the appearance of order X in the Buffer Order Work Register 2410. The order X is gated to the Order Word Register 3403 (while still being retained in the Buffer Order Word Register 2410 for the indexing cycle) during phase 3 of the cycle 2; upon reaching the Order Word Register 3403 the final gating actions (herein indicated as the execution cycle) for the order X are controlled via Order Word Decoder 3409.

The indexing cycle and the execution cycle are each less than a 5.5 microsecond machine cycle in duration. In the executing of the operational steps of a sequence of orders like those shown in FIG. 6 each order remains in the Order Word Register 3403 and the Buffer Order Word Register 2410 each for one 5.5 microsecond cycle. The Buffer Order Word Decoder 3902 and the Order Word Decoder 3904 are DC combinational circuits; the DC output signals of the decoders are combined with selected microsecond clock pulses (among those indicated in FIG. 5) in the Order Combining Gate Circuit 3901. This Order Combining Gate Circuit 3901 thus generates the proper sequences of gating signals to carry out the indexing cycle and the execution cycle of each of the sequence of orders in turn as they appear first in the Buffer Order Word Register 2410 and then in the Order Word Register 3403.

The performance of the operational steps for certain orders requires more time than one operational step period, i.e., more than 5.5 microseconds. This requirement for additional time may be specified directly by the order; however, in other instances this requirement for additional time is imposed by indicated trouble conditions which occur during the execution of an order. Where an order specifies that the execution thereof will require more than one operational step period, the additional processing time for that order may be gained by:

1. Performing the additional data processing during and immediately following the indexing cycle of the order and before the execution cycle of the order; or 2. Performing the additional data processing during and immediately after the normal execution cycle of the order.

The performance of these additional work functions is accomplished by way of a plurality of sequence circuits within Central Control 101. These sequence circuits are hardware configurations which are activated by associated program orders or trouble indications and which serve to extend the time in the operational step beyond the normal operational step period illustrated in FIG. 6. The period of time by which the normal operational step period is extended varies depending upon the amount of additional time required and is not necessarily an integral number of machine cycles. However, the sequences which cause delays in the execution of other orders always cause delays which are an integral number of machine cycles.

The sequence circuits share control of data processing within the Central Control 101 with the decoders, i.e., the Buffer Order Word Decoder 3902, the Order Word Decoder 3904, and the Mixed Decoder 3903. In the case of orders in which the additional work functions are performed before the beginning of the execution cycle, the sequence circuit or, as more commonly referred to, the "sequencer" controls the Central Control 101 to the exclusion of decoders 3902, 3903, and 3904. However, in the case of orders in which the additional work functions are performed during and immediately after the execution cycle of the order, the sequencer and the decoders jointly and simultaneously share control of the Central Control 101. In this latter case there are a number of limitations placed on the orders which follow an order which requires the enablement of a sequencer. Such limitations assure that the central control elements which are under the control of the sequencer are not simultaneously under control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within Central Control 101 and with selected clock pulses in the Order Combining Gate Circuit 3901 to generate gating signals. These signals carry out the required sequence circuit gating actions and cause the counter circuit to advance through its sequence of internal states.

Sequence circuits which extend the period of an operational step by seizing control of a Central Control 101 to the exclusion of the decoders 3902, 3903, and 3904 are arranged to transmit the address of the next succeeding program order word concurrently with the completion of the sequencer gating actions. Thus, although the execution of the order immediately succeeding an order which enabled the sequencer of the above character is delayed, the degree of overlap shown in FIG. 6 is maintained.

Sequence circuits which do not exclude the decoders 3902, 3903, and 3904 provide additional overlap beyond that shown in FIG. 6. That is, the transmission of the address of and acceptance of the order immediately succeeding an order, which enabled a sequencer, are not delayed. The additional gating actions required by such sequence circuits are carried out not only concurrently with the indexing cycle of the immediately succeeding order, but also concurrently with at least a portion of the execution cycle of the immediately succeeding order.

For example, a program order which is employed to read data as opposed to program order words from the Program Store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

Central Control Responses to Program Order Words

FIGS. 2—4, which show the Central Control 101, aid in understanding the basic operational step actions that are performed by Central Control 101 in response to various program order words. Each program order word comprises an operational field and a data-address field.

The operation field is a 14 or a 16 bit binary word which defines the order and specifies the operational step actions to be performed by the Central Control 101 in response to the order. The operation field is 14 or 16 bits long, depending on the particular order which is defined by the operation field.

There are sets of "options" that may be specified with each of the program order words. The operational step of each order consists of a specific set of gating actions to process data contained in Central Control 101 and/or communicate information between the Central Control 101 and other units in our system. When an option is specified with the program order being executed, additional data processing is included in the operational step. Accordingly, a portion of the 14 or 16 bit operation field of a program order word specifies the program order, and the remaining portion of the field may select one or more of the options to be executed.

Certain of the options are compatible with and provide additional data processing for nearly all of the orders. An example of such an option is that of "'indexing" in which none or one of seven flip-flop registers within Central Control 101 are selected for additional data processing. In the orders which permit indexing a three bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, Central Control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability. This conditional assignment advantageously permits the inclusion of a larger variety of orders and options than could otherwise be included in the 14 to 16 bit operation field.

The data-address field of a program order word is either a 23 bit data word to be placed in a selected flip-flop register in Central Control 101 or a 21 bit word which may be used directly or with indexing to form a code-address for addressing memory. In all order words the sum of the bits of the operation field (16 or 14) plus the bits of the data-address field 21 or 23 is always 37 bits. If the order word has a 16 bit operation field, its data-address field will be 21 bits long; if the operation field is 14 bits long, the data-address is a 23 bit number. The shortened D–A field is utilized to obtain more combinations in the correspondingly lengthened operation field and therefore a larger and more powerful collection of program order words.

The Central Control 101 performs the operational steps for most orders at the rate of one order per 5.5 microsecond cycle. Although such orders are designated single cycle orders, the total time involved in obtaining the order word and the central control responses thereto is in the order of three 5.5 microsecond cycles. The overlap operation permits Central Control 101 to achieve the stated rate of performing one such single cycle order every 5.5 microseconds.

The sequence of gating actions for a typical order, order X, and their relationship to the gating actions for the preceding order, order X−1, and a succeeding order, order X+1, are shown in FIG. 6. As shown on line 2 of FIG. 6, during phase 1 of a 5.5 microsecond cycle that is arbitrarily designated cycle 1, the code and address of program order word X appears in the Program Address Register 4801 and is gated to the Program Store 102 via the Program Store Address Bus 6400. The code and address is interpreted by the Program Str 102 and the order word X is returned to central control o\ ̦r the Program Store Response Bus 6500 sometime during phase 3 of cycle 1 or phase 1 of cycle 2. The operation field portion of the program order word is gated into the Auxiliary Buffer Order Word Register 1901, and the data-address field, and the Hamming bits of the order word are gated into the Buffer Order Word Register 2410.

The operation field is first gated into the Auxiliary Buffer Order Word Register 1901 since it is possible that the program order word which is returned from the Program Store 102 reaches Central Control 101 prior to completion of the gating actions by the Buffer Order Word Decoder 3902 on the preceding order word, in this case order word X−1. This may be seen by reference to FIG. 6 where in the line labeled X−1, the gating directed by the Buffer Order Word Decoder 3902 for the order word X−1 is completed at the end of phase 3 of cycle 1; and, as shown in the line labeled X, the program order word X may reach central control in the latter portion of phase 3 of cycle 1. The Auxiliary Buffer Order Word Register 1901 resolves this conflict. The same situation does not obtain with respect to either the Hamming encoding bits or the data-address word as by the end of phase 2 of cycle 1 all of the actions with respect to both the Hamming encoding bits and the data-address bits for the order X−1 have been completed.

The time at which a program order word reaches the Central Control 101 is subject to variation as a result of a number of factors. For example, since there are two central controls and a number of program stores, the physical distance between a particular central control and each of the program stores is different and this difference is reflected in both the Program Store Address Bus 6400 and in the Program Store Response Bus 6500. Further, there may be differences in the response times of the various program stores and their access circuits and these variations may be cumulative with the differences in bus lengths.

The decoded outputs of the Buffer Order Word Decoder 3902 are combined with selected clock pulses from the Microsecond Clock 6100 in the Order Combining Gate Circuit 3901 which operates selected gates within Central Control 101 in the proper time sequence during phase 2 and phase 3 of the second cycle to perform indexing, index modification, and certain other gating actions with respect to order X.

During phase 3 of the second cycle the operation field of order X (FIG. 6) is gated from the Buffer Order Word Register 2410 to the Order Word Register 3403. The Order Word Decoder 3904 decodes the operation field of the order X which is in the Order Word Register 3403 for the performance of the remaining gating actions. DC output signals from the Order Word Decoder 3904 are combined with selected pulses from the Microsecond Clock 6100 in the Order Combining Gate 3901 to complete the gating actions of the single cycle order X during phase 1 and phase 2 of the third cycle.

During phase 2 of the third cycle order X is completing its last gating action from the Order Word Register 3403 and the Order Word Decoder 3904 and order X+1 is simultaneously performing the indexing step from the Buffer Order Word Register 2410 and the Buffer Order Word Decoder 3902. Since the simultaneous gating actions may conflict in the use of the flip-flop registers such as XR, YR, ZR, etc., the Mixed Decoder 3903 decodes the contents of both the Buffer Order Word Register 2410 and the Order Word Register 3403. The Mixed Decoder 3903 outputs, which are DC signals, are combined with the outputs of the Buffer Order Word Decoder 3902 in the Order Combining Gates 3901 to modify gating actions so as to resolve conflicts in the two operational steps.

A conflict which is resolved by the Mixed Decoder 3903 occurs when a first order specifies a particular one of the index registers as the destination register for a memory word obtained by the execution of that order while the immediately succeeding order specifies that the contents of that same index register be employed in indexing. In the performance of indexing, the contents of the specified index register are normally gated from the output of the specified index register to the Unmasked Bus 2014 and from there via AND gate 2914 to the Augend Register 2908 of the Index Adder arrangement. However, where successive orders specify the same index register as a destination register for memory reading and as a source register, there is insufficient time to complete the transfer of the information to the destination register; therefore, the Mixed Decoder 3903 in these instances transfers the desired information from the Masked Bus 2011 via AND gate 2913 directly to the Augend Register 2908 at the same time that this information is being transmitted to the specified destination index register.

Mask and Complement Circuit 2000 (M&C)

The internal data processing structure is built around two multiconductor buses, the Unmasked Bus 2014 and the Masked Bus 2011, which provide a link for moving a multibit word of data from one of a specific group of flip-flop registers to another. This group consists of the Index Registers 2601 (BR), 5801 (FR), 5802 (JR), 4001 (KR), 2501 (XR), 3001 (YR), and 3002 (ZR) and the Logic Register 2508 (LR).

The Mask and Complement Circuit 2000 (M&C) connects the Unmasked Bus 2014 to the Masked Bus 2011 and provides means for logically operating upon the data as it passes from the Unmasked Bus to the Masked Bus. The logical operation to be performed, product masking (AND), union masking (OR), exclusive OR masking (EXCLUSIVE-OR), and complementing is prescribed by the operation field of the program order as decoded by either the Buffer Order Word Decoder 3903. Only one masking operation may be performed in a single pass of data through the circuit M&C; however, the masking operation may be followed by a complementing operation in gating data through the circuit M&C. Each of the masking operations requires two operands and the contents of the Logic Register LR always comprises one of the operands.

The Mask and Complement Circuit M&C (2000) also provides a convenient means for connecting the Data Buffer Register 2601 and the Index Adder Output Register 3401 to the Masked Bus 2011. The data word which appears at one of the input AND gates of the Mask and Complement Circuit 2000 may be selectively gated directly to the Masked Bus 2011 without alteration or may be masked and/or complemented during transmission through the mask and complement circuit. The AND-OR Circuit of the Mask and Complement arrangement 2000 serves to "Union" mask or "Product" mask the input data word when enabled by order cable signals on conductors 20UMASK and 20PMASK, respectively. The word appearing at the output of the AND-OR Circuit may be complemented in the Complement Circuit of the Mask and Complement arrangement 2000 by enabling order cable conductor 20COMP or may be transmitted directly to the Masked Bus 2011 by enabling order cable conductor 20MPASS.

The input data word may be gated directly to the Masked Bus 2011 by enabling order cable conductor 20PASS or may be complemented by enabling order cable conductor 20COMP.

Exclusive OR masking may be achieved by enabling order cable conductor 20XMASK.

K Register 4001 (KR); K Logic

Detect First-One Circuit 5415 (DFO)

The K Register KR, the K Logic, and the Detect First-One Circuit 5415 (DFO) provide a second major internal data processing facility. The K Logic comprises input and output circuitry surrounding the K Register 4001. The K Logic includes the K A Input Register 3502, the K B Input Register 3504, the K Input Logic 3505, the K Logic Homogeneity Circuit 4502; and at the output of the K Register 4001 the Rotate Shift Circuit 4500 and the K Register Homogeneity Circuit 4503. The K Input Logic 3505 may be directed by output signals of the Order Combining Gate 3901 to perform one of four logical operations on two operands. One operand is the content of the K Register KR; the other is the information on the Masked Bus 2011. The Order Word Decoder OWD and the K Register Sequence Circuit (one of the sequence circuits SEQ1–SEQN) generate signals which cause the K Input Logic 3505 to combine the two operands in the operations of AND, OR, EXCLUSIVE-OR, or ADDITION. The word resulting from the logical combination, according to the order in the Order Word Register 3403, may either be gated to the K Register 4001 or to the Control Homogeneity Circuit 5000 and the Control Sign Circuit 5413.

A word appearing on the Masked Bus 2011 may in some instances be gated directly to the K Register 4001 via the K Input Logic 3505. The K Register KR may thereby be employed as a simple destination register for data like other flip-flop registers in central control such as XR, YR, ZR, etc.

In carrying out the ADDITION operation in the K Input Logic 3505 the two operands are treated as 22 bit signed numbers. The 23rd bit of each operand is the sign bit. If this bit has the value 0 the number is positive, and the magnitude of the number is given by the remaining 22 bits. If the sign bit is 1 the number is negative, and the magnitude of the number is given by the one's complement of the remaining 22 bits. (The magnitude is determined by inverting each bit of the 22-bit number.) The add circuit within K Input Logic 3505 can correctly add any combination of positive and negative operands as long as the magnitude of the algebraic sum of the two operands is equal to or less than $2^{22}-1$.

The K Logic and the K Register 4001 can perform other logical operations on the contents of the K Register. One of these operations is given the name "SHIFT". The gating action performed by "SHIFT" is based, in part, on the least significant six bits of the number that appears in the Index Adder Output Register 3401 at the time the shift is to be performed. The least significant five bits constitute a number that indicates the magnitude of the shift, and the sixth bit determines the direction of the shift. A 0 in the sixth bit is interpreted as a shift to the left, and the remaining five bits indicate the magnitude of this shift. A 1 in the sixth bit is interpreted as a shift to the right, and the one's complement of the remaining five bits indicates the magnitude of the shift to the right. Although in shifts to the right the least significant five bits contain the one's complement of the magnitude of the shift, the six bit number will be referred to hereafter as comprising a sign and a magnitude.

A logical operation similar to the shift is the operation "ROTATE". As in shifting, the six bits of the Index Adder Output Register 3401 are treated as a direction and magnitude for the rotation just as described for the shift.

A rotate of one to the left is identical to a shift of one to the left except for the gating of the flip-flops at each end of the K Register 4001. In a rotation of one to the left the content of bit 22 is not lost as in the shift but instead replaces the content of the least significant zero bit of the K Register 4001. A rotate of two to the left is identical to two rotates of one to the left in succession, a rotate of three to the left is identical to three rotates of one to the left, et cetera. A rotate of 23 to the left has the same effect on the K Register 4001 as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K Register 4001.

Another logical gating action is the determination of the rightmost one in the contents of the K Register 4001. This action is accomplished by gating the contents of the Detect First-One Circuit 5415 (DFO) to the F Register 5801 via the Unmasked Bus 2014, the Mask and Complement Circuit 2000, and the Masked Bus 2011. The number gated is a five bit binary number corresponding to the first stage (reading from the right) in the K Register 4001 which contains a 1. If the least significant bit of the K Register KR contains a 1, zero is the number gated to the F Register 5801. If the first 1 reading from the right is in the next position, one is the number gated to the F Register 5801. If the only 1 appearing in the K Register 4001 is in the most significant position, 22 is the number gated to the F Register 5801. If the K register contains no 1's, then nothing is gated to the F Register 5801.

Index Adder Arrangement

A third major data processing configuration within the Central Control 101 is the Index Adder 2904, 2908, 3401, 3407 which is used to:

1. Form a quantity designated herein as the indexed DAR word consisting of the sum of the D–A field of the program order word being executed and the contents of an index register specified in an order, or 2. To perform the task of a general purpose adder; the operands in this latter instance may be the contents of two index registers or the D–A field and the contents of an index register.

The Index Adder arrangement comprises an Addend Register 2904, an Augend Register 2908, a parallel Adder 3407, and an Index Adder Output Register 3401. The outputs of the Index Adder are selectively connected to the Program Address Register 4801, the Memory Address Decoder 3905, and the Call Store Address Bus System 6401 when employed for indexing; the outputs of the adder may also be connected to the Masked Bus 2011 via the Mask and Complement Circuit 2000 when employed as a general purpose adder. Access to the Masked Bus 2011 permits the word formed to be employed for a number of purposes, for example:

1. Data to be placed in the K Register 4001 without modification or to be combined with the contents of the K Register in the K Input Logic 3505;

2. A number for determining the magnitude and direction of a shift or rotate;

3. Data to be placed in a specified index register;

4. Data to be transmitted over the Network Command Bus 6406 via the K A Input Register 3502 and the Command Translator 3509;

5. Data to be sent to the Central Pulse Distributor 143 via the F Register 5801 and the Central Pulse Distributor Translator 5422.

Indexing is the adding of two numbers in the Index Adder 3407. The D–A field of the order as it appears in the Buffer Order Word Register 2410 is one operand used in indexing and the other operand, if required, is the contents of one of the seven Index Registers BR, FR, JR, KR, XR, YR, and ZR. For orders which include the indexing option a three bit number within the operation field specifies either (1) no indexing, or (2) indexing on one of the seven flip-flop registers according to the following table.

| X34 | X33 | X32 | Register |
|---|---|---|---|
| 0 | 0 | 0 | No register |
| 0 | | 1 | 9BR |
| 0 | 1 | 0 | 9FR |
| 0 | 1 | 1 | 9JR |
| 1 | 0 | 0 | 9KR |
| 1 | 0 | 1 | 9XR |
| 1 | 1 | 0 | 9YR |
| 1 | 1 | 1 | 9ZR |

If no register is specified for indexing, then only the D–A field is gated to the Index Adder arrangement and the output of the Index Adder arrangement will be the D–A field (the sum of the D–A field and zero). If an index register is specified, the contents thereof are normally gated onto the Unmasked Bus 2014 and from there directly into the Index Adder arrangement.

If the order X (FIG. 6) specifies indexing, and if the index constant is obtained by a memory reading operation of the preceding order X−1, then the Mixed Decoder (MXD) 3903 substitutes the Masked Bus 2011 for the index register. The Mixed Decoder 3903 insures that the Index Adder arrangement always has the correct operands to perform the timely addition to complete the operational step for order X.

A number of the orders have as an option specified by a combination of bits in the operation field the loading of the D–A field into the Logic Register (LR) 2508. This option permits the placing of specified new data into the Logic Register for use in subsequent masking operations, If the D–A field is used to load the Logic Register, then it is considered not available for indexing and the only operand gated to the Index Adder arrangement is the contents of a specified index register.

The sum appearing at the output of the Index Adder arrangement is referred to as the DAR address or word. If indexing is not specified in an order, the DAR address or word is the D–A field of that order. If indexing is specified and the D–A field is not gated to the Logic Register 2508, the DAR address or word will be the sum of the D–A field and the contents of the specified index register. If the D–A field is used for loading the Logic Register, the DAR will be the contents of the specified index register.

The Index Adder arrangement, as well as the add circuit within the K Input Logic 3505, utilizes one's complement binary arithmetic. All inputs of the Index Adder 3407 are treated as 22-bit numbers with the 23rd bit a sign bit. A positive number is indicated by a 0 in the 23rd bit and a negative number by a 1 in the 23rd bit. End-around-carry is provided so that the Index Adder arrangement can correctly handle all four combinations of positive and negative operands as long as the algebraic sum of the two operands does not exceed $2^{22}-1$.

Some orders, as previously mentioned, have a 23 bit D–A field. If the D–A field is only 21 bits long, then the 21st bit is treated as the sign bit; this bit is expanded to also become the 22nd and 23rd bits of the effective D–A field gated to the Index Adder arrangement. Expansion converts a 21 bit D–A field to an effective 23 bit D–A field for indexing. Expansion preserves the end-around-carry for indexing with 21 bit D–A fields.

Decision Logic 3906 (DEC)

The Central Control 101 in the execution of a decision order in a sequence of orders either continues with the current sequence of orders or transfers to a new sequence of orders. The decision is made by the Decision Logic 3906 in accordance with the order being processed. The order specifies the information to be examined and the basis for the decision. The information may be obtained from the Control Homogeneity Flip-Flop 5020, the Control Sign Flip-Flop 5413 or selected outputs of the K Logic 3505. The basis of the decision may be that the information examined is (or is not) arithmetic zero, less than zero, greater than zero, et cetera. A decision to advance does not disturb the current sequence of obtaining and executing orders. A decision to transfer to a new sequence of orders is coupled in accordance with the particular word being executed to a determination of whether the transfer is an "early transfer" or a "late transfer". Accordingly, if the decision is made to transfer, either the early transfer conductor ETR or the late transfer conductor LTR will be energized and thereby activate the Transfer Sequencer 4401. Transfer signals from these conductors lead to the gating of the transfer address to the Program Address Register 4801. This causes the next program order word to be obtained from a new sequence of order words. The transfer address may be obtained from a number of sources and the source is indicated by the order being executed. In the case of "early transfer" orders, the transfer address comprises the contents of a preselected one of the J Register 5802 or the Z Register 3002. In the case of "late transfer" orders the transfer address may be obtained directly, in which case the DAR code-address which is formed in the index adder is employed, or indirectly, in which case the transfer address comprises a memory reading at the location specified by the DAR code-address which is formed in the Index Adder arrangement. This latter case is referred to herein as indirect addressing.

The distinction between "early transfer" and "late transfer" orders is based on whether or not the decision order requires a memory reading or writing in the event of an advance. A decision order which requires a memory to be read or written into after a decision to advance is an "early transfer" order. If the decision on such an early transfer order is to advance, then the memory reading or writing operation is carried out as a normal gating action under control of the Buffer Order Word Decoder 3902 and the Order Word Decoder 3904. However, if the decision is to transfer, the decision is advantageously made "early" to inhibit the gating associated with the memory reading or writing operation.

Other transfer orders which do not require a memory reading operation but which do require extensive data processing prior to making the decision are termed "late transfer" orders. These orders cannot employ the early transfer timing sequence in that the data processing operations required thereby are not necessarily completed by the time the early transfer signal would be generated.

Two input information sources for the decision logic comprise the output signals of the Control Homogeneity Flip-Flop 5020 and the Control Sign Flip-Flop 5413 which are employed to register homogeneity and sign information which is obtained from a number of locations. For example, a 23 bit data word appearing on the Masked Bus 2011 may be transmitted to the Control Homogeneity Circuit 5000. If the data word comprises either all 0's or all 1's, the the Control Homogeneity Flip-Flop 5020 will be set to its 1 state, otherwise the flip-flop will be reset. The Control Sign Flip-Flop 5413 serves to retain the sign of the data word; the Control Sign Flip-Flop 5413 is set if the word is negative and is reset if the word is positive.

The Control Homogeneity Circuit 5000 and the Control Sign arrangement are utilized by some decision orders by gating the output of a selected index register onto the Unmasked Bus 2014, through the Mask and Complement Circuit 2000, onto the Masked Bus 2011, and from there into the Control Homogeneity Circuit 5000 and the Control Sign Flip-Flop 5020. The contents of one of the seven index registers specified in the decision order being processed are thereby summarized in the Control Homogeneity Flip-Flop 5020 and Control Sign Flip-Flop 5413. Further gating actions associated with a decision order carry out the transfer or advance according to the output of the Decision Logic 3906.

Similar homogeneity and sign circuits provide facilities for a class of decision orders which transfer or advance according to combinations of the homogeneity and sign of 23 bit words contained in the K Register 4001.

Communication Between The Central Control 101 And Connecting Units

A basic function of Central Control 101 is the communication between itself and various other units such as the various memories within the Central Processor 100, the Switching Network 120, the Master Scanner 144, the Central Pulse Distributor 143, et cetera. Generally, communication is accomplished by way of the various bus systems of FIG. 1 and logic circuits which are located in both Central Control 101 and the connecting units.

This communication consists of three general classes. The first class comprises the obtaining of program order words which determine the sequence of actions within Central Control 101. Program order words are primarily obtained from the Program Store 102; however, in special instances program order words for limited actions may be obtained from a Call Store 103. The second class comprises the obtaining of data (excluding program order words) from the memory units within the Central Processor 100, and the third class comprises the generation and transmission of commands to the various network units such as the Switching Network 120, the Master Scanner 144, the Central Pulse Distributor 143, et cetera.

The several memories within the Central Processor 100, namely the Program Store 102, the Call Store 103, the Auxiliary Buffer Registers ABR–1...ABR–N (FIG. 2), and certain other special locations within Central Control 101 are treated as a memory unit and distinct blocks of addresses are individually assigned to each of the memories. There are a number of memory orders which are employed to selectively obtain information from the above memories and to place this information in selected registers within Central Control 101; these are memory reading orders. There are other memory orders which are employed to selectively transmit data from designated registers within Central Control 101 to one of the above memories; these are memory writing orders. The order structure is thus simplified since access to all of the above-mentioned memory locations is by way of a single memory address format.

A memory code-address within Central Control 101 always comprises a twenty bit word consisting of:

1. A code to define a block of information; and
2. An address within the specified block.

The code and the address each vary in length according to the memory unit addressed. For example, the codes for specifying information blocks in the program store are four bits long, and the corresponding address is 16 bits long; the codes for specifying information blocks in the Call Store 103 are eight bits long and are accompanied by 12-bit addresses. However, as will be seen later, the code-address which is transmitted to the Call Store 103 comprising an 18-bit portion of the word, namely a six bit code and a 12-bit address.

Program Order Words

The communication between the Central Control 101 and the Program Store 102 to obtain program order words may be understood generally with reference to FIGS. 2 through 4 and the timing diagram FIG. 6. The Program Address Register 4801 (PAR) and the Auxiliary Storage Register 4812 (ASR) are selectively employed in transmitting commands to the Program Store 102. The contents of the Program Address Register 4801 are gated via AND gates 4805 and 3300 to the Program Store Address Bus System 6400. The contents of the Auxiliary Storage Register 4812 are gated via AND gates 4813 and 3300 to the Program Store Address Bus System 6400.

The information required to define the code-address of a program store command is transmitted to the Program Address Register 4801 by one of the three possible paths, the chosen path being determined by the sequence of events which lead to the determination of the desired address and code. The desired code-address is selectively obtained by one of the following methods:

A. In the course of executing a sequence of program order words and in the absence of a transfer decision, the code-address of the next order word in the sequence is obtained by incrementing the code-address of the preceding order word by a count of 1. This incrementing function is accomplished by means of the Add-One Register 4304 and the Add-One Logic 4305. The contents of the Program Address Register 4801 are transmitted via AND gate 4301 to the Add-One Register 4304 at time OT2. The code-address in the Add-One Register 4304 comprises the input to the Add-One Logic 4305 which increments the input word by a count of 1. The output of the Add-One Logic 4305 is gated to the Program Address Register 4801 via AND gate 4807 at time 3T5.

From the above sequence it is seen that a very small portion of the 5.5 microsecond operational step cycle is employed in incrementing the address in the Program Address Register 4801. That is, the total time required to increment the address and to return the incremented address to the PAR 4801 is the period of time OT5. Completion of address incrementing in this period of time frees the Add-One Register 4304 and the Add-One Logic 4305 to permit their use for other work functions during the remainder of the cycle.

B. The second source of program store code-address words is the Index Adder Output Register 3401. The Index Adder Output Register 3401 is provided to store the DAR word as described earlier herein. The contents of the Index Adder Output Register 3401 are transmitted via cable 3402 and AND gate 4307 to the Program Address Register 4801.

C. The third source of code-address information is the Masked Bus 2011, the contents of which are gated to the Program Address Register 4801 via cable 4313 and AND gate 4308 at time 3T5. This path is employed in the case of early transfer orders to gate the contents of the J Register 5802 or the Z Register 3002 to the Program Address Register 4801.

The transmittal of commands from the Central Control 101 to the Program Store 102 and the transmittal of the program store responses to the Central Control 101 may be understood by reference to FIG. 6. In FIG. 6 the three horizontal lines represent functions which occur with respect to arbitrary orders X−1, X, and X+1, respectively. A machine cycle, as employed in the time scale of this figure, comprises a 5.5 microsecond period of time. A portion of an arbitrary cycle 1 and all of the following cycles 2 and 3 are shown. As seen in FIG. 6, the period of time between the transmission of the command to the Program Store 102 and the completion of the operational step associated with that command require greater than one 5.5 microsecond machine cycle. However, also as seen in FIG. 6, there are work functions relating to three separate orders being simultaneously performed; therefore, it is possible to complete single cycle orders at the rate of one order per 5.5 microsecond cycle.

At line X of FIG. 6 the code-address of order X is shown as being transmitted to the Program Store 102 during phase 1 of cycle 1 and the program store response thereto returned to the Central Control 101 sometime during the latter portion of cycle 1 or the early portion of cycle 2. The program store response comprises parallel ⅛microsecond pulses which represent the program order word.

The response word is transmitted via the Program Store Response Bus System 6500 and AND gate 1200 for insertion in the Auxiliary Buffer Order Word Register 1901 and the Buffer Order Word Register 2410. Bits 0 through 20 (the data-address field) are gated directly into the Buffer Order Word Register 2410. Bits 21 through 36 (the operation field) are inserted into the Auxiliary Buffer Order Word Register 1901.

The data address field is gated directly to the Buffer Order Word Register 2410 as the portions of the register which are employed to store this information are no longer required by the immediately preceding order; however, the work operations with respect to the operation field of the preceding order may not have been completed by the time the program store response has arrived at the Central Control 101. Therefore the operation field is first inserted into the Auxiliary Buffer Order Word Register 1901 and then at time 6T8 is gated to the Buffer Order Word Register 2410.

Data Words

As previously described, a large body of information organized as data words as opposed to program order words is stored principally in the Call Store 103 and the Program Store 102. The more volatile information is stored principally in the Call Store 103, while the more stable information is stored in the Program Store 102.

Data words may be read from a memory location or written into a memory location by the execution of program orders termed "memory orders." Included in this term are "memory read orders" and "memory write orders." However, memory write orders are not applied to the Program Store 102.

Call Store Memory Orders

Memory reading (writing) orders which obtain (store) data from the Call Store 103 include call store reading (writing) commands as part of their operational step. The operational step of such orders is indicated by the example of order X in FIG. 6; in that example call store commands are generated and transmitted during phase 3 of the indexing cycle. If X is a memory reading order, the call store response will be transmitted from the Call Store 103 to the Data Buffer Register 2601 during phase 1 of the execution cycle; if X is a memory writing order, the word to be stored is transmitted from the Data Buffer Register 2601 to the Call Store 103 during phase 1 of the execution cycle.

The execution of memory orders by Central Control 101 to move data words between the Call Store 103 and the Central Control 101 is initiated by the transmission of call store commands from Central Control 101 to the Call Store 103 via the Call Store Address Bus System 6401. If the command is to write a data word into the Call Store 103, then the command is followed by the transmission of the data word via the Call Store Write Data Bus System 6402. If the command is to read a data word, then the call store read command is followed by the transmission of the data word from the Call Store 103 to Central Control 101 via the Call Store Response Bus System 6501.

In executing a call store command the code-address is always composed in the Index Adder Output Register 3401 which is electively connectable to the Call Store Address Bus System 6401.

A call store writing command utilizes as data to be stored a 23-bit word in the Data Buffer Register 2601. The outputs of the Data Buffer Register 2601 are transmitted via AND gate 1020, to the Call Store Write Data Bus System 6402. In the execution of the call store command to write data into the memory, the data word is transmitted during ST7 following the transmission of the initial parts of the call store command onto the Call Store Address Bus System 6401.

In the execution of call store reading commands the response comprises a 23-bit word of data appearing as ½ microsecond pulses on the Call Store Response Bus System 6501. The call store response signals appear in parallel at the input terminals of the Call Store Response Bus Selection Gates 1300, and are gated from there to the Data Buffer Register 2601.

In FIG. 6 it is indicated that within Central Control 101 the data processing of reading from a memory other than a Program Store 102 occurs in phase 2 during the execution cycle and with the Call Store Response Bus Selection Gates 1300 enabled for the time 0T11 the call store response is returned prior to this time, that is, it is returned during phase 1 during the execution cycle. It should be noted that the Call Store Response Bus Selection Gates 1300 are enabled for a period of time which greatly exceeds the period, i.e., ½microsecond of the call store response signals. This greater period of time permits acceptance of the full pulse width (approximately .5 microseconds) of the call store bus response signals without regard for variations in time of response of the cal Call Store 103 and variations in length of cable connecting the Call Store 103 and the Central Control 101.

Program Store Memory Orders

Memory reading orders may also address memory locations within the Program Store 102. In such instances the step produces a code-address corresponding to a program store memory location to be read. Memory reading orders for obtaining data from a Program Store 102 utilize the same channels for addressing the store and for receiving the response employed in obtaining program order words. When data is to be read from a Program Store 102 the Data Reading Sequencer 4903 (one of the sequencers SEQ1—SEQN of FIG. 3) is activated. The sequencer is required since the obtaining of data from a Program Store 102 must be interleaved with the obtaining of program order words. Accordingly, this sequencer responds by storing the code-address of the next program order word temporarily in the Add-One Register 4304 and placing into the Program Address Register 4801 and the data code-address by gating the outputs of the Index Adder Output Register 3401 thereto. The Data Reading Sequencer 4903 extends the processing time of a memory reading order by two 5.5 microsecond cycles. These two cycles are inserted in the operational step as set forth in FIG. 6 at the end of the indexing cycle and before the execution cycle. In the first cycle injected by the Data Reading Sequencer 4903 the order following the memory reading order is ignored and the data code-address is transmitted to the Program Address Register 4801. From there this code-address is transmitted as part of a program store command onto the Program Store Address Bus System 6400. In the second machine cycle injected by the Data Reading Sequencer 4903 the data reading is returned from the Program Store 102 via the Program Store Response Bus System 6500 to the Buffer Order Word Register 2410. From there a selected half of the 37 bit data reading is transmitted to the Data Buffer Register 2601, the selected half determined by bit 20 of the code-address formed in the indexing step of the order. When these functions are completed the Data Reading Sequencer 4903 is returned to the inactive state, and the memory reading order proceeds to its execution cycle wherein the data (now appearing in the Data Buffer Register 2601) is utilized to complete the operational step.

Auxiliary Buffer Register Memory Orders

Memory reading and writing orders may also address a selected one of the auxiliary buffer registers ABR1—ABRN (FIG. 2). In such instances the DAR word is a code-address corresponding to the selected one of the auxiliary buffer registers. This code-address appears in the Index Adder Output Register 3401 and is utilized to transmit data from the Data Buffer Register 2601 to a selected one of the auxiliary buffer registers for memory writing orders or to transmit data from a selected one of the auxiliary buffer registers to the Data Buffer Register 2601 for memory reading orders.

A memory reading order which addresses a selected one of the auxiliary buffer registers transmits the contents of a selected one of the auxiliary buffer registers to the Data Buffer Register 2601. This gating action occurs during OT8 (phase 1) of the execution cycle.

Memory writing orders which place date into a selected one of the auxiliary buffer registers utilize the contents of the Index Adder Output Register 3401 to generate a signal to transmit the contents of the selected one of the registers via the Data Buffer Register 2601 and the Buffer Register Output Bus 2600 to a selected one of the auxiliary buffer registers ABR1—ABRN. In that certain of the auxiliary buffer registers have a 24-bit capacity as opposed to the 23 bit length of data words as processed within Central Control 101, a the additional bit is provided in one of the bits of the indexed code-address as it appears in the Index Adder Output Register 3401.

The address which selects the particular auxiliary buffer register for reading or writing appears in bit positions one through five of the Index Adder Output Register 3401 during the execution of the memory order. When a memory writing order specifies a 24 bit auxiliary buffer register, then bit zero of the code-address appearing in the Index Adder Output Register 3401 serves as the 24 bit of data. An order cable conductor is provided for this purpose and is enabled according to contents of the least significant bit of the Index Adder Output Register 3401 thereby supplying the 24 bit of data on the Buffer Register of Output Bus 2600.

THE ORDER STRUCTURE FOR CENTRAL CONTROL

As previously defined the order structure refers to the entire collection of program orders and options available with each such order. Each program order word consists of a 14 or 16 bit operation field and a 23 or 21 bit D–A field to form a 37-bit program order word. Each order in the order structure has a corresponding combination of 1's and 0's; however the following discussion employs the mnemonic representation of the order without reference to the binary coding employed.

In carrying out the operation step for an order the gating actions are divided into two groups. The first group includes the preliminary action of indexing, index register modification, placing the D–A field of the order into the Logic Register 2508, gating address signals to the Call Store 103 on memory reading or writing orders directed thereto, et cetera. This group of gating actions are those derived from the order as it appears in the Buffer Order Word Register 2410 and the associated response of the Buffer Order Word Decoder 3902 and the Mixed Decoder 3903. In most instances this first group of gating actions generates by indexing a 23-bit word of data (designated herein as the DAR word) or a 21 bit memory code-address to obtain a 23-bit word of data from a location in one of the memory units. The second group of gating actions are those performed via the Order Word Decoder 3904 in response to the appearance of the order in the Order Word Register 3403. The second group includes, according to the order, gating a data word (a DAR word or a memory reading) into the Logic Register 2508 or one of the index registers, performing the gating of the output of the decision logic, et cetera.

The order structure includes two classes of orders that manipulate data words among the Logic Register 2508, the seven index registers, and memory. In one of these two classes the DAR word is treated as data. This data word, according to the order being executed, has some logical operation performed upon it, and the resulting word replaces the contents of one of the index registers. Such orders are characterized herein as operating upon a DAR word and this characteristic is indicated in the mnemonic representation of the order by the letter W.

The second class of orders treats the number appearing at the output of the Index Adder Output Register 3401 as a code-address for writing into or reading data words from a Call Store 103, reading data words from a Program Store 102, or reading or writing data words from or to one of the Auxiliary Data Buffer Registers ABR–1 through ABR–N. These units, provided for the storage of data are collectively named memory, and memory orders comprise the second group which is characterized herein by the letter M.

Move Orders

When data words are placed in an index register or the Logic Register 2508 or when data is moved between memory and one of these registers, information is moved from some particular source to a specified destination. The class of orders which performs an operational step of this kind is designated MOVE orders. Move orders are mnemonically represented by two letter codes, one of the letters being W or M to indicate whether a DAR word or a memory reading is the quantity being moved. The remaining letter specifies a flip-flop register within Central Control 101;

B represents the Data Buffer Register 2601,
F represents the F Register 5801,
J represents the Jump Register 5802,
K represents the K Register 4001,
L represents the Logic Register 2508,
X represents the X Register 2501,
Y represents the Y Register 3001, and
Z represents the Z Register 3002.

Two letter move orders are then arranged so that the first letter indicates the source of the information being moved and the second letter indicates the destination. For example, WX represents an order which generates a DAR data word (W) which is moved to the X Register 2501 (X). YM is the mnemonic representation of an order which moves the contents of the Y Register 3001 (Y) via the Data Buffer Register 2601 into a memory location (M) specified by the DAR address. MK corresponds to an order which generates a DAR address to read a memory location, the data thereby read (M) is moved via the Data Buffer Register 2601 and the K A Input Register 3502 into the K Register 4001 (K).

W Class Move Orders

WL

The operational step of this order consists of generating a DAR word in the Index Adder 3407 and moving that word to the Logic Register 2508. The first gating action in the processing of order WL is the generation of the DAR word by combining in the Index Adder 3407 the 23 bit D–A field as it appears with the order WL in the Buffer Order Word Register 2410 with a second operand. The second operand is either the number zero or a 23-bit number obtained from one of the index registers. The process of indexing for the order WL is an option. If this option is not to be exercised then the number zero is combined with the D–A field in the Index Adder 3407. If the option of indexing is specified with the order WL it is indicated by combinations of 1's and 0's in certain bits of the operation field. These bits specify both the option and the index register to be used. The index register may be one of seven flip-flop registers within the central control; the Data Buffer Register 2601, the F Register 5801, the JUMP Register 5802, the K Register 4001, the X Register 2501, the Y Register 3001, or the Z Register 3002.

If an index register is specified the output of the selected index register is placed in the Augend Register 2908. This gating action is accomplished by gating the output conductors of the selected index register onto the unmasked bus at time 10T16. Simultaneously, the contents of the unmasked bus are gated into the augent register at time 10T14. If no indexing is specified, the prior resetting of the Augend Register 2908 at time 8T10 leaves a zero in the Augend Register 2908. As the D–A field and the contents of an index register (or the number 0) are registered in the Addend Register 2904 and the Augend Register 2908, respectively, the Index Adder 3407 generates, as its output, the sum of these two operands. The sum which appears on the Index Adder Output Conductors is gated into the Index Adder Output Register 3401 at time 15T17.

The completion of the operational step of order WL is under control of the Order Word Decoder 3904. The DAR word appearing in the Index Adder Output Register 3401 is moved through the Mask and Complement Circuit 2000 onto the Masked Bus 3 2011 and from there into the Logic Register 2508. The gate 20PASS is activated to move the DAR word from the Index Adder Output Register 3401 through the Mask and Complement Circuit 2000 onto the masked bus.

In addition to the indexing option which is performed by the Buffer Order Word Decoder 3902 the option of complementing the DAR word prior to placing this word in the Logic Register 2508 is provided with the order WL. If complementing is specified by a corresponding combination of bits in the operation field of the order WL, then as the DAR word is moved through the Mask and Complement Circuit 2000 the gate 20COMP is activated instead of the gate 20PASS. This difference in the gating action causes the DAR word to be complemented and the number thereby appearing on the Masked Bus 2011 is the one's complement of the DAR word as it appeared in the Index Adder Output Register 3401. The Logic Register therefore receives the complemented value of the DAR word.

Another option, this one associated with the option of indexing, is available with the order WL and is performed via control signals generated in the Buffer Order Word Decoder 3902. This option is mnemonically represented as the A option, and consists of adding one to the number appearing in the index register specified, and replacing the contents of the specified index register with the incremented number. The A option is performed simultaneously with the gating of a specified index register into the Augend Register 2908 as previously described for indexing. The outputs of the specified index register are gated to the Unmasked Bus 2014 and, simultaneously with the operation of gating the Unmasked Bus to the Augend Register, the word appearing on the Unmasked Bus 2014 is gated into the Add-One Register 4304. For example, if indexing specifies the Z Register 3002 and the A option is also specified in the order WL, then during 10T16 the gate 3009 is activated and in the corresponding time 10T14 the gates 2914 and 4302 would be activated. The contents of the Z Register 3002 are thereby gated to the Index Adder 3407 and to the Add-One Register 4304. The outputs of the Add-One Register 4304 are connected to the inputs of the Add-One Logic 4305, and the Add-One Logic 4305 (when enabled by a signal on the associated order conductor) responds by generating on its output conductors a number one greater than the contents of the Add-One Register 4304. The A option is therefore completed by gating the outputs of the Add-On Add-One Logic 4305 back to the Z Register 3002 via the Masked Bus 2011. This step is accomplished by activating the gate 4820 on 16T22 thereby connecting the output conductors of the Add-One Logic 4305 onto the Masked Bus 2011. The A option is completed by concurrently gating the number thereby appearing on the Masked Bus 2011 into the Z Register 3002 by activating the gate 3008 on 16T20.

In summary, assuming that WL is the order X exemplified in FIG. 6, the gating actions proceed as follows. On phase 2 of cycle 2 the D–A field and any specified index register are gated into the Index Adder 3407. If the A option is specified the index register is also gated during this time into the Add-One Register 4304. If the A option is specified then on phase 3 of cycle 2 the Buffer Order Word Decoder 3902 completes the first group of gating actions of WL by moving the incremented value of the index register contents back to the specified index register. On phase 1 of cycle 3 the order word decoder completes the operational step of WL by moving the DAR word now appearing in the Index Adder Output Register 3401 through the Mask and Complement Circuit 2000, performing the complementing action therein if so specified, and moving the DAR word or its complement onto the Masked Bus 2011 and into the Logic Register 2508.

WX

The execution of the order WX proceeds as described for the order WL with the exception that the DAR word formed in the Index Adder Output Register 3401 is moved through the Mask and Complement Circuit 2000, onto the Masked Bus 2011, and into the X Register 2501.

The order WX has the indexing option, the A option, and the complement option previously described for the order WL. The execution of these gating actions is identical to that described for the order WL.

In addition to the options provided for WL the order WX has the PL and PS masking options. The letter P indicates that a product mask operation is to be performed. The letter L in specifying the PL option indicates that the word contained in the Logic Register 2508 prior to the processing of the order WX is the second operand in performing the product operation. That is, if the PL masking operation is specified, then the DAR word will be combined with the contents of the Logic Register 2508 on an AND basis, and the resulting logical combination is the word which is moved to the X Register 2501. If PS masking is specified, then the logical AND operation is performed as indicated, but in this case the 23 bit D–A field of WX is first moved to the Logic Register 2508 prior to the moving of the DAR word through the Mask and Complement Circuit 2000 and into the X Register 2501. The S therefore stands for the "set up" of the Logic Register 2508 to the value specified in the D–A field before product masking.

Either the PL or the PS option but not both may be specified for use with the order WX. If PL masking is used, then the previously described process of indexing is unaltered. However, if PS masking is specified, then the D–A field is considered to be preempted for use in the Logic Register 2508, and therefore meaningless in indexing and the D–A field is accordingly made unavailable for indexing. The D–A field is instead moved to the Logic Register 2508 via a private bus connecting the outputs of the data address portion of the Buffer Order Word Register 2410 to the input gate 2504 of the Logic Register 2508. In this instance of specifying a PS option, the specified index register would then become the DAR word. Activating the gate 2504 on 15T17 of cycle 2 "sets up" the Logic Register 2508.

If the PL or PS masking option is specified, the DAR word is gated during phase 1 of cycle 3 through the Mask and Complement Circuit 2000. However, to carry out the masking operation the gate 20P–MASK is activated instead of the gate 20PASS so that the logical AND of the DAR word and the outputs of the Logic Register 2508 are generated therein. If the complementing option is not simultaneously specified, then the gate 20MPASS is activated to move the outputs of the Mask and Complement Circuit 2001 onto the Masked Bus 2011. The gating actions proceed as before to place the product of the DAR word and the contents of the Logic Register 2508 into the X Register 2501.

Masking and complementing can simultaneously be specified for the order WX. If so, then the DAR word is transmitted through the Mask and Complement Circuit 2000 by activating both the gates 20P–MASK and the a gate 20COMP–M which causes the DAR word to be combined with the contents of the Logic Register 2508 and the result is complemented before it is gated onto the Masked Bus 2011 and into the X Register 2501. To carry out the PS Mask option instead of the PL option all the preceding gating actions described for the order WX are the same except that the gate 2504 is activated on 15T17 (the end of phase 2 and the beginning of phase 3 of cycle 2).

,WY, WZ, WF, WJ

The order WY (WZ, WF, WJ) moves the DAR word formed in the Index Adder 3407 through the Mask and Complement Circuit 2000 onto the Masked Bus 2011 and into the Y Register 3001 (Z Register 3002, F Register 5801, J Register 5802). The gating actions of this order are identical with those of the order WX including the available options and the gating actions associated with these options except that the DAR word as it appears on the Masked Bus 2011 during phase 1 of cycle 3 is placed into the Y Register 3001 (Z Register 3002, F Register 5801, J Register 5802).

In the execution of order WK a signal on the corresponding order cable conductor at phase 1 of cycle 3 gates the DAR word from the Masked Bus 2011 to the K A Input Register 352. The K B Input Register 3504 is priorly reset during the execution of a preceding order. Subsequently, the output of the K Input Logic 3505 is gated to the K Register 4001 at time 9T11. Accordingly, the sum gated to the K Register 4001 is the DAR word unmodified, because the K B Register 3504 is zero.

WB

The execution of this order consists of moving the DAR word formed in the Index Adder 3407 through the Mask and Complement Circuit 2000 onto the Masked Bus 2011 from the Masked Bus 2011 into the Insertion Mask 2109 and from there into the Data Buffer Register 2601. This order with respect to indexing the A option and the masking and complementing options is identical to order WX; however, instead of operating the gate 2500 on 0T6 of cycle 3, one of the gates of the Insertion Mask Circuit 2109 is enabled to move the DAR word into the Data Buffer Register 2601.

In addition to the masking options previously described for the order WX the order WB has two masking options mnemonically represented by ES and EL, respectively. These are the insertion masking options as represented by the letter E. If PS or PL options are not specified, then EL or ES (but not both) options may be specified. The letters S and L have the same meanings as they did in PS and PL. That is, the ES option includes the preempting of the D–A field for gating into the Logic Register 2508 rather than gating to the Addend Register 2904 of the Index Adder 3407. Similarly, the EL option is performed using the 23-bit word currently appearing in the Logic Register 2508.

Insertion masking involves three operands: a data word appearing on the Masked Bus 2011, the contents of the Data Buffer Register 2601, and the contents of the Logic Register 2508. Insertion masking may be utilized whenever data appearing on the Masked Bus 2011 is to be selectively moved into the Data Buffer Register 2601; this option utilizes the contents of the Logic Register 2508 to select the bits of the data word appearing on the Masked Bus 2011 to be gated into the corresponding bit positions of the Data Buffer Register 2601. That is, wherever a 1 appears in the Logic Register 2508 the corresponding bits of data appearing on the Masked Bus 2011 are gated into the like positions of the Data Buffer Register 2601; whenever a 0 appears in the Logic Register 2508 the corresponding bit position of the Data Buffer Register 2601 remains unchanged.

If insertion masking is specified for order WB, the data appearing on the Masked Bus 2011 is gated through the Insertion Mask Circuit 2109 and into the Data Buffer Register 2601 in every bit position where the corresponding bit position in the Logic Register 2508 contains a one. If a bit position in the Logic Register 2508 contains a zero, the corresponding bit position in the Data Buffer Register 2601 remains unchanged.

M Class Move Orders

There are two M class move orders corresponding to each W class move order. As previously explained, M class orders employ the DAR word as a memory code-address. Orders of the first subclass of M class orders are employed to read the memory at this code-address and to transmit the reading to a specified index register. Orders of this subclass are referred to herein as M class read orders. Orders of the second subclass of M move orders are employed to write data obtained from a specified register in memory at the code-address specified in the DAR word and are referred to herein as M class write orders.

The correspondence of W class orders and M class orders is illustrated by the orders MX and XM which are the M class move read and M class move write orders corresponding to the order WX.

In the case of M class read orders the data obtained from the memory is always first returned to the Data Buffer Register 2601 and from there (when required) to the Mask and Complement Circuit 2000 via the Buffer Register Output Bus 2600 and to the Masked Bus 2011.

M class read orders, with only minor exceptions, may specify the A, PL, PS, and complementing options and the processing of the data at the output of the OR gate 2004 proceeds in M class orders the same as described with respect to W class orders. M class orders, both read and write, may specify two additional index register modification options, namely, the W option and the REG S option. These options are carried out under the control of the Buffer Order Word Decoder 3902 during phase 2 and phase 3 of cycle 2.

The W option may be specified whenever the indexing option is selected. The DAR word formed and placed in the Index Adder Output Register 3401 consists of the algebraic sum of the D–A field and the contents of a specified index register; this sum is transmitted to the specified index register and stored therein during phase 3 of the indexing cycle whenever the W option is specified. The word is transmitted via the Mask and Complement Circuit 2000 and the Masked Bus 2011 to the index register utilized in the indexing step.

When the REG S option is performed the indexing step is not carried out; the DAR word generated in the Index Adder 3407 and transmitted to the Index Adder Output Register 3401 consists of the D–A field of the program order word. This is accomplished during the indexing cycle by gating the D–A field to the Addend Register 2904 as described for the indexing step and resetting the Augend Register 2908.

The REG S option is similar to the W option in that the 23-bit word appearing in the Index Adder Output Register 3401 is transmitted during phase 3 of the indexing cycle to the index register specified in the program order word. Accordingly, the specification of the REG S option also requires the selection of one of the seven index registers.

M class write orders, with only minor exceptions may specify the index register modification options A, W and REG S and the data modification options PL, PS, complement, EL, and ES. The exceptions to the applicable options of both M class read orders and M write orders apply when a memory reading is to be placed in the Data Buffer Register 2601 or the Logic Register 2508; or data which is to be written into a memory is obtained from the Data Buffer Register 2601.

In the order ML the data reading may be complemented but no masking options are provided since a "closed loop" condition would occur and an erroneous transient information signal could be propagated and incorrectly established in the Logic Register 2508. The closed loop consists of the output conductors of the Logic Register 2508, the Mask and Complement Circuit 2000, the output conductors of the Mask and Complement Circuit 2000, the Masked Bus 2011, and the AND GATE 2505, and the Logic Register 2508.

A similar loop condition would occur in the orders BM and MB if data were gated from the Data Buffer Register 2601 through the Mask and Complement Circuit 2000 and back to the Data Buffer Register 2601. Accordingly, the only data masking options available to these orders serve to permit the placing of the D–A field into the Logic Register 2508 for subsequent data processing.

The PS masking option is available to the order LM for the one specific purpose of writing the D–A field of the order LM into a location in memory. In this instance the memory code-address has been previously placed in an index register; this register is specified by the order LM for indexing to obtain the code-address of the memory location which is to received the D–A field. The contents of the Logic Register 2508 —i.e., the D–A field of the order, are moved through the Mask and Complement Circuit 2000 wherein the logical product of the contents of the Logic Register 2508 and those same contents are formed. The result, the D–A field of the order, is then placed into the Data Buffer Register 2601 for writing in the specified memory location.

In the execution of the order MK the AND gate 3500 is enabled at phase 2 of cycle 3, this is preceded by the resetting of the K B Input Register 3504 during a preceding machine cycle and the subsequent gating of the output of the K Input Logic Circuit 3505 to the input terminals of the K Register 4001 during time 18T20. The K Input Logic 3505 when enabled by an order cable signal on Conductor 35ADD serves to add the contents of the K A Input Register 3502 and the K B Input Register 3504. In the case of order MK the sum is the contents of the K A Input Register 3502 as the K B Input Register 3504 has been reset to zero.

It should be noted that the signal on conductors 35ADD and the signal gating the K Input Logic Circuit 3505 to the K Register 4001 occur after the time that the order MK is found in the Order Word Register 3403. As will be explained later herein, these gating actions are under control of the K Register Sequencer 5701.

Combining Orders

In addition to the move orders just described, the order structure includes orders that generate W or M data words which are combined with the existing contents of one of the flip-flop registers in Central Control 101 such as the K Register 4001, the X Register 2501, etc. The mnemonic representation of combining orders is similar to that of the move orders. The combining operation (which may be add, subtract, OR, AND, EXCLUSIVE-OR, or compare) is designated in the first letter of the symbolic representation of this class of order. The second letter represents the operand to be combined; and it may be either W or M to respectively designate the DAR word of data or a data reading from a memory location. The third letter indicates the register which contains the second operand and in which the resulting combination of the two operands is to be stored. For example, AWK represents a program order word for which the operational step consists of generating a DAR word in the Index Adder 3407 which is then added to the contents of the K Register 4001, and the sum then replaces the contents of the K Register 4001. Another example is the order UMX. Its operational step includes obtaining (via a DAR address) a data word from a location within a specified memory unit and placing this reading in the Data Buffer Register 2601. The 23-bit data word placed therein is then combined in an OR operation (the letter U indicates union, another name for OR) with the contents of the the X Register 2501, and the resulting 23-bit word replaces the contents of the X Register 2501.

The symbolic representations of the combining operations are:

A—Add
S—Subtract
U—Union (OR)
P—Product (AND)
X—EXCLUSIVE-OR
C—Compare (gating action described below).

The timing of options and the moving of the combined operand into the specified destination register is in general identical with that of the previously described move orders; the essential difference is in the appearance of additional order cable signals within the same time framework to carry out the combining operation.

W Class Combining Orders

It is assumed that in the description of the operational step of the orders which follow that the order being described is the example shown in FIG. 6.

AWK

This order generates a DAR word in the Index Adder 3407. This word is transmitted from the output Conductors 3402 of the Index Adder Output Register 3401 to the inputs of the Mask and Complement Circuit 2000 during phase 1 of cycle 3. After possible masking therein the word is transmitted via the Masked Bus 2011 to the inputs of the K A Input Register 3502. The present contents of the K Register are simultaneously transmitted to the inputs of the K B Input Register 3504 via the output conductors 4006 and the AND gate 3503. This is accomplished at time 3T5 during phase 1 of cycle 3. A DC signal on the order cable conductor 35ADD causes the K Input Logic Circuit 3505 to generate on its output leads the sum of its two input words. The input words are the outputs of the K A Input Register 3502 containing the DAR word (as possibly modified by masking) and the outputs of the K B Input Register 3504 which has just received the present contents of the K Register 4001. The sum, as it appears on the output conductors of the K Input Logic Circuit 3505, is transmitted to the inputs of the K Register 4001 via the AND gate 3506 at time 9T11, early in phase 2 of cycle 3.

SWK

The operational step of this order subtracts the DAR word from the contents of the K Register 4001 and places the difference in the K Register 4001.

The gating actions for SWK are identical to AWK except that the complementing gating actions are utilized in transmitting the DAR word through the Mask and Complement Circuit 2000. This has the effect of adding the one's complement of the DAR word to the present contents of the K Register 4001. Since the additional logic (which is activated in executing SWK) within the K Input Logic Circuit 3505 includes the necessary end-around-carry features, the net effect is subtraction of the DAR word from the present contents of the K Register 4001 and the placing of the resulting difference into that Register.

PWK

The operational step of order PWK places in the K Register 4001 the logical product (AND) of the DAR word and the contents of the K Register 4001.

The execution of order PWK is identical to AWK with the exception that order cable conductor 35AND is enabled instead of conductor 35ADD so that the K Input Logic Circuit 3505 forms the logical product of the DAR word (after possible masking and complementing in the Mask and Complement Circuit 2000) and the present contents of the K Register 4001. The resulting product is gated as before through the AND gate 3506 into the K Register 4001.

UWK

The operational step of this order performs the union (Logical OR) of the DAR word and the contents of the K Register 4001 and the result is placed in the K Register 4001.

The execution of order UWK is identical to that of PWK with the exception that the combining operation of OR instead of AND is carried out in the K Input Logic Circuit 3505 by an order cable signal on conductor 35OR instead of conductor 35AND.

XWK

The operational step of this order combines the DAR word and the contents of the K Register 4001 in an EXCLUSIVE-OR gate, and the result is placed in the K Register 4001.

The actions for XWK are identical to those of PWK with the exception that the combining operation of EXCLUSIVE-OR is performed on the DAR word and the present contents of the K Register 4001; and it is this EXCLUSIVE-OR combination that is gated to the K Register 4001. This is achieved by carrying out all the same gating actions as for PWK except that the gate 35EXCL OR is activated instead of 35AND so that the K Input Logic Circuit 3505 generates the EXCLUSIVE-OR combination of its two input words.

CWK

The DAR word is compared with the contents of the K Register 4001, and the result is placed in the control flip-flops 5020 and 5413. The contents of the K Register 4001 are unchanged in the execution of CWK.

The comparison is achieved by subtracting the DAR word from the contents of the K Register 4001; the gating actions performed for CWK are therefore similar to those performed for SWK. The difference of the operands is not, however, gated to the K Register 4001. Instead, during 10T12 (roughly the beginning of phase 2 of cycle 3), the sign bit of the output of the K Input Logic Circuit 3505 is connected to the set and reset inputs of the C Sign Flip-Flop 5413. The output of the K Logic Homogeneity Circuit 4502 indicates the homogeneity of the difference of the DAR word and the present contents of the K Register 4001 as this difference appears at the output of the K Input Logic Circuit 3505. The outputs of the K Logic Homogeneity Circuit is gated to the set and reset inputs of the Control Homogeneity Flip-Flop 5020.

If the words being compared are identical of magnitude and sign, the Control Homogeneity Flip-Flop 5020 will be set in the execution of CWK; any difference in the operands being compared will result in the resetting of the Control Homogeneity Flip-Flop 5020.

CWKU

The operational step and corresponding actions of the order CWKU are identical to CWK with the one exception that the bit placed in the Control Homogeneity Flip-Flop 5020 is the OR combination of the present state thereof and the homogeneity of the difference generated in comparison as indicated by the output of the K Logic Homogeneity Circuit 4502.

This difference in the gating action is accomplished in the execution of CWKU by an order cable signal during 10T12 which places the sign of the difference as it appears on the output conductor of the K Logic Input Circuit 3505 in the C Sign Flip-Flop 5413.

The OR of the present state of the Control Homogeneity Flip-Flop 5020 and the homogeneity information generated in the comparison is achieved by gating the output of the K Logic Homogeneity Circuit 4502 only to the set input of the Control Homogeneity Flip-Flop 5020. If the comparison results are inhomogeneous, then no reset signal is applied to the Control Homogeneity Flip-Flop 5020 and it therefore remains unchanged in the execution of CWKU. The Control Homogeneity Flip-Flop 5020 will therefore contain a 1 whenever it has been previously set or if the comparison performed in execute CWKU yields a homogeneous difference.

PWX

The operational step of this order utilizes the Mask and Complement Circuit 2000 to generate the AND combination of the DAR word and the contents of the X Register 2501. The resulting combination is then placed in the X Register 2501.

The gating action proceeds in two parts. During the indexing cycle (phase 3 of cycle 2) the contents of the X Register 2501 are placed in the Logic Register 2508. After the contents of the X Register 2501 are placed in the Logic Register 2508 the DAR word is gated during phase 1 of cycle 3 from the Index Adder Output Register 3401 through the Mask and Complement Circuit 2000 onto the Masked Bus 2011 and from there into the X Register 2501. The product mask operation is performed in the Mask and Complement Circuit 2000 during the transmission of the DAR word therethrough. The word therefore appearing on the Masked Bus 2011 is the AND combination of the DAR word and the present contents of the X Register 2501 as it appears in the Logic Register 2508. Gating this AND combination into the X Register 2501 completes the operational step of PWX.

UWX

The operational step of this order generates the OR combination of the DAR word and the present contents of the X Register 2501 and places the resulting combination into the X Register 2501. In executing this order the contents of the X Register 2501 first replace the contents of the Logic Register 2508 in the manner described for PWX.

The gating actions for UWX are identical with those performed for PWX with the exception the OR combination instead of the AND combination for the two operands is formed in the Mask and Complement Circuit 2000 by a signal on order cable conductor 20U MASK instead of 20P MASK.

PWY, UWY, PWZ, UWZ

These orders combine the DAR word in AND or OR combination (according to the appearance of P or U in the symbolic representation of the order) with the contents of the Y Register 3001 or the Z Register 3002 (according to the appearance of Y or Z in the symbolic representation of the order) and the resultant combination replaces the contents of the indicated Y Register 3001 or Z register Register 3002.

M Class Combining Orders

The operational step of the M Class combining orders listed herein carry out combining operations in the K Input Logic Circuit 3505 and/or the Mask and Complement Circuit 2000 in the same manner described for the W class combining orders. The resulting combinations are placed in the register specified in the order. For each of the W class combining orders there is therefore a corresponding M class combining order. The M Class combining orders are accordingly: AMK, SMK, PMK, UMK, XMK, CMK, CMKU, PMX, UMX, PMY, UMY, PMZ, UMZ.

The difference in the two groups of combining orders is that in the case of W class orders one of the operands in the DAR word (W) and in the other case of M class orders one of the operands is a memory reading (M). In the class of M class combining orders the operand is placed in the Data Buffer Register 2601 instead of the Index Adder Output Register 3401. This operand is then gated through the Mask and Complement Circuit 2000 to the register specified by the order.

In reading a data word from a selected location within a memory unit the data reading is utilized as the operand during phase 2 of cycle 3 for M class combining orders instead of during phase 1 of cycle 3 as is done in executing W class combining orders. A corresponding change in the time of the appearance of the appropriate gating signals for M class combining orders achieves this difference.

One additional change occurs as a result of this shift in time. In a memory reading order or an M class combining order for which the reading of the resultant combination is placed in the K Register 4001, the gating of the outputs of the K Input Logic Circuit 3505 to either the K Register 4001 or to the Control Flip-Flops 5020 and 5413 are deferred until 18T20 as previously noted in describing the gating actions of the order MK. In the case of the M class combining orders this delay applies to the order AMK, PMK, UMK, XMK, CMK, and CMKU.

This gating action occurs after the order no longer appears in the Order Word Register 3403. Therefore, the K Register Sequencer 5701 is activated to perform the gating just described and to control the logic selection signals 35ADD, 35AND, 35OR, and 35EXCLUSIVE-OR during the interval which extends beyond the execution cycle of the order.

SEQUENCE CIRCUITS IN CENTRAL CONTROL AND MISCELLANEOUS ORDERS

The sequence circuits (SEQ1–SEQN [FIG. 3]) may be used singly or in combinations to carry out multicycle orders either by inserting extra cycles or by extending the overlap of the actions for the order. Some sequence circuits are enabled with each appearance of orders related while others are enabled in response to detected troubles.

Each sequence circuit described herein comprises a synchronous electronic counter circuit which is advanced with selected clock pulses from the Microsecond Clock 6100. The sequence circuits are normally in the inactive state as represented by all of the internal state flip-flops being reset. To activate a sequence circuit a start signal from the Order Combining Gate Circuit 3901 causes its counter to advance from the inactive state to a first active state. The counter then proceeds to advance through a succession of active states, each advance occurring after a preselected time interval. In some instances the advance from one active state to the next may be deferred for a varying number of 5.5 microsecond cycles until an appropriate signal indicates that the sequence circuit is to again continue advancing through its state.

Eventually the sequence circuit advances to the inactive state as the actions required thereof are completed; the sequence circuit is then ready to repeat these actions in response to a new request.

The sequence circuits act both to selectively inhibit the decoder in Central Control 101 and to carry out gating actions by the generation of signals on the appropriate order cable conductors. The outputs of the internal state flip-flops are combined with pulses from the Microsecond Clock 6100 in the Order Combining Gate Circuit 3901 to generate the order cable signals, and DC combinations of the internal states of the sequence circuit are combined in the Order Combining Gate Circuit 3901 to generate inhibit signals on certain order cable leads.

K Register Sequencer

The K Register Sequencer controls the generation of gating signals for M class move orders or M class combining orders which pass data through the K Input Logic 3505 to either the K Register 4001 or the control flip-flops 5020 and 5413. This sequencer performs the necessary gating actions extending beyond the execution cycle of those memory orders which select a memory reading as one of the operands to be combined in the K Input Logic 3505. For example, assume order X of FIG. 6 is the memory order AMK which reads a data word from a Call Store 103. Accordingly, the K Register Sequencer is activated during phase 1 of cycle 3 (3T5), carries out the gating of the outputs of the K Input Logic 3505 during phase 3 of cycle 3 (18T20) into the K Register 4001 and returns to the inactive state during phase 1 of cycle 4 (1T3).

This sequencer jointly and simultaneously shares control of Central Control 101 with the decoders 3902—3904 and extends the degree of overlap rather than inserting additional machine cycles for the operational steps of program orders thus served. Therefore, the operational step of order X is extended to phase 3 of cycle 3, and the amount of overlap with respect to order X+1 is increased as may be seen with FIG. 6.

A selected one of two flip-flops within the K Register Sequencer are set during phase 1 of cycle 3 if the order X is CMK or CMKU, respectively. The state of these flip-flops then determines the gating actions which must take place during 18T20 in order to gate the output of the K Input Logic 3505 to the K Register 4001, and in order to adjust the Control Sign and the Control Homogeneity Flip-Flops (5413, 5020).

During the extended time in which the order no longer appears in the Order Word Register 3403 and the gating controlled by the K Register Sequencer 5701 is taking place the signals on one of the order cable leads 35ADD, 35AND, 35OR, or 35EXC OR must be maintained in order that the correct output of the K Input Logic 3505 is retained during 18T20 in phase 3 of cycle 3. This extended control of signals on 35ADD, 35AND, et cetera, is derived in the K Register Sequencer 5701 by the setting of additional flip-flops contained within the K Register Sequencer 5701. If none of the flip-flops are set, the gating signal to be generated by the K Register Sequencer 5701 is to appear on 35ADD during phase 2 and phase 3 of cycle 3. If the first of these three flip-flops is set, then the K Register Sequencer 5701 is to generate a signal on 35AND during phase 2 and phase 3 of cycle 3, if the second of the three flip-flops is set, the signal is to appear on 35OR, and if the third of the three flip-flops is set, the signal is to appear on 35EXC OR. The outputs of these flip-flops and the output of the internal state flip-flop of the K Register Sequencer 5701 are combined in the Order Combining Gate Circuit 3901 to generate for corresponding memory reading order the signal on the appropriate one of the four leads 35ADD, 35AND, et cetera.

If the data reading obtained from a Program Store 102 is the operand to be combined in the K Input Logic Circuit 3505 under control of the K Register Sequencer 5701, the Data Reading Sequencer 4903 (one of the sequencers SEQ1—SEQN [FIG. 3]) inhibits the decoder outputs, inserts extra cycles, obtains the reading and places it in the Data Buffer Register 2601. A signal from the Data Reading Sequencer 4903 causes the activation of the K Register Sequencer 5701 to be delayed for the necessary additional cycles required for obtaining the program store data reading.

Data Reading Sequencer (4903)

When a memory reading order generates a program store code-address in the execution of its indexing cycle, the Data Reading Sequencer 4903 is activated. This sequencer responds by advancing through a succession of active states to insert two 5.5 microsecond cycles into the operational step of the memory reading order. During these two cycles signals appear on output conductors of the internal state flip-flops of the sequencer to selectively inhibit the outputs of the Buffer Order Word Decoder 3902, the Mixed Decoder 3903, and the Order Word Decoder 3904 after the indexing cycle has been completed for the memory order and before the execution cycle is started for that order. These signals also serve to retain the memory reading order in the Order Word Register 3403. Similarly, the code-address of the memory reading order is retained in the Index Adder Output Register 3401.

The program store command for the order following the memory reading order in sequence is transmitted to the program store prior to the beginning of the indexing cycle for the memory reading order. The next order word will therefore appear in the Buffer Order Word Register 2410 in the cycle following the appearance therein of the memory reading order. In that memory reading is a command to obtain information from the Program Store 102 and in that all program store responses are returned to the Auxiliary Buffer Order Word Register 1901 and the Buffer Order Word Register 2410, this following order will be displaced by the memory reading order. Accordingly, after the memory reading order has been executed, the Program Store 102 must be readdressed to obtain the order following the memory reading order in sequence. The Data Reading Sequencer 4903 prevents the occurrence of any premature responses to this following order by inhibiting the actions of the Buffer Order Word Decoder 3902, the Mixed Decoder 3903 and the Order Word Decoder 3904, after the indexing cycle of the memory reading order.

The program store code-address of the order following the memory reading order is transmitted to the Program Store 102 from the Program Address Register 4801. In the execution of single cycle orders, this command address is transmitted via AND gate 4301 to the Register 4303. 4304. The code-address is subsequently incremented in the Add-One Logic 4304. The code-address is subsequently incremented in the Add-One Logic 4305. The output of the Add-One Logic 4305 is gated via AND gate 4807 to transfer the incremented address to the Program Address Register 4801.

However, in that the Program Store 102 must be readdressed, the Add-One Logic 4305 is not incremented in the execution of a program store memory reading order. The Add-One Logic 4305 thus serves to merely transfer the contents of the Add-One Register 4304 to the Program Address Register 4801. Therefore, the program store code-address for readdressing the Program Store 102 to obtain the next order in sequence is retained in the Add-One Register 4304 during the two machine cycles which are added by the Data Reading Sequencer 4903.

The code-address for the memory reading, which was generated by the memory reading order and which is retained in the Index Adder Output Register 3401, includes a tag bit which indicates that the left half or the right half of the program store response is desired. The program store response will comprise 37 bits of data. A data word which is to be processed within Central Control 101 comprises only 23 bits; therefore, the appropriate portion, i.e., left or right portion, of the program store response must be selected.

It should be noted that data words which are processed within the Central Control 101 are always right adjusted, that is, the least significant bit of the word is found in bit position zero and the significance of the bits increases from right to left. Data words obviously do not in all cases require 23 bits to convey the desired information; therefore, the 37 bits, i.e., O through 36 of a program store data word are arranged to provide two data words each of which may vary in length in accordance with the required information content thereof. The 37 bits are nominally divided into a right half word comprising bits 0 through 22 and a left half word comprising bits 23 through 36; however, where the left half data words require additional bits to convey the desired information, bits 22 and 21 of the left half word are selectively added to the left end of the left half word to add information capacity thereto. The Data Reading Sequencer 4903 transmits the selected "half" from the Buffer Order Word Register 2410 to the Data Buffer Register 2601. Right half words comprising bits 0 through 22 of the data word are transmitted from the Buffer Order Word Register 2410 to the Addend Register 2904 at time 10T14 via AND gate 2902. Left half data words including the optional bits 21 and 22 are gated from the Buffer Order Word Register 2410 to the Addend Register 2904 at time 10T14 via AND gate 2911. In that both the right half word, i.e., bits 0 through 22, and the left half word, bits 23 through 36 22, 21 are both right adjusted to their least significant bits, namely bit 0 and bit 23, then bits 21 and 22 may be individually and selectively employed as part of the left half or part of the right half word by masking these bits out in the processing of data. That is, if bits 21 and 22 are to be employed as part of the left half word, then in the processing of the right half word bits 21 and 22 are masked out and, conversely, if bits 21 and 22 are to be employed as part of the right half word, these bits are masked when processing the left half word. If bits 21 and 22 are not required in either the left half or the right half word, these bits will both be 0 and masking is not required in the processing of either word.

The Augend Register 2908 is reset at time 8T10 just prior to the time that the selected half of the data word is transmitted to the Addend Register 2904. The Index Adder 3407 combines the contents of the Addend Register 2904 (the selected half of the data word) and the contents of the Augend Register 2908 (zero); therefore, the output of the Index Adder 3407 is the selected half of the data word. The output of the Index Adder 3407 is subsequently gated to the Index Adder Output Register 3401. Subsequently, the Data Reading Sequencer 4903, as it advances through its active states, enables other order cable conductors to move the contents of the Index Adder Output Register 3401 to the Data Buffer Register 2601 via the Mask and Complement Circuit 2000, the Masked Bus 2011 and the Insertion Mask 2109.

After the data reading which has been obtained from the Program Store 102 as described above has been placed in the Data Buffer Register 2601, the further processing performed in the execution cycle of the memory reading order continues in the same manner that such processing would be performed in the case of a memory reading order which obtained data from the call store.

Accordingly, the Data Reading Sequencer 4903 is returned to its inactive state at which time the inhibit signals which have restrained the actions of the Order Word Decoder 3904, the Mixed Decoder 3903, and the Buffer Order Word Decoder 3902 are removed. It should be noted, however, that during the second added cycle the Data Reading Sequencer 4903 serves to transmit the program store command to obtain the next word in the sequence of order words. That is, the code-address which was retained in the Add-One Register 4304 is transmitted without being incremented through the Add-One Logic 4305, and AND gate 4807, to the Program Address Register 4801. The contents of the Program Address Register 4801 are in turn transmitted both to the Auxiliary Storage Register 4812 and to the Program Store Command Bus System 6400. This step is in accordance with the sequence of operations outlined in FIG. 6, that is, the program store command to obtain the next order word in a sequence is transmitted in sufficient time to assure that the program store response thereto will arrive in the Auxiliary Buffer Order Word Register 1901 and the Buffer Order Word Register 2410 in the time relationships set forth in FIG. 6.

R Combining Orders

R combining orders specify that the Index Adder 3407 is to carry out the addition, subtraction or comparison of two operands and one of the operands always comprises the contents of an index register specified by the order. Two special orders AWRP and CWR utilize the D–A field of the order as the other operand, while the remaining R combining orders employ the contents of another index register or the logic register as the other operand. R combining orders further specify that the output word of the Index Adder 3407 is to be transferred to the index register specified by the order without alteration.

The mnemonic representation of each of the orders of the R class comprise three or four elements. The first mnemonic element may be A, S, or C, respectively, specifying that the two operands be added, subtracted or compared.

The second mnemonic element specifies the source of the other operand and may be W, meaning the D–A field of the order or one of the previously enumerated mnemonic symbols of the seven index registers or the logic register.

The third mnemonic element is the letter R, specifying the R class of combining orders. Only the special order AWRP employs a fourth mnemonic element, namely P, which indicates that the actions taken under this order are conditioned upon the state of the C Sign Flip-Flop 5413 as determined by the preceding order.

A—R, S—R

Each of these orders specifies that the contents of two registers in the Central Control 101 be combined by addition or subtraction, respectively. In the execution of these orders the operand which is contained in the index register specified in the index register field of the order is placed in the Augend Register 2908 during phase 2 of the indexing cycle. During phase 3 of the indexing cycle the operand which is defined by the second mnemonic element of the order is moved to the Addend Register 2904 via the Mask and Complement Circuit 2000. In those orders which specify that the two operands be combined by subtraction the operand which is moved through the Mask and Complement Circuit 2000 is complemented; therefore, the one operand is added to the complement of the other operand in the Index Adder 3407 to accomplish subtraction.

By way of example, the order SBR indicates that the contents of the Data Buffer Register 2601 comprises one of the two operands to be combined by subtraction, while the index register subfield bits 32, 33, and 34 by way of example only specify the F Register 5801 as the other or R operand. That is, the contents of the Data Buffer Register 2601 is to be subtracted from the contents of the F Register 5801 and the difference placed in the F Register 5801. The contents of the Data Buffer Register 2601 are unchanged. The contents of the F Register 5801 are gated to the Augend Register 2908 via a path which includes AND gate 5803, the Unmasked Bus 2014, and AND gate 2914. AND gate 5803 is enabled at the time 10T16 while AND gate 2914 is enabled at time 10T14.

The contents of the register specified by the second mnemonic element of the order, in this example the contents of the Data Buffer Register 2601, are gated to the Addend Register 2904 via a path which includes the Buffer Register Output Bus 2600, the Unmasked Bus 2014, the Mask and Complement Circuit 2000, the Masked Bus 2011, and AND gate 2912. The input to the Mask and Complement Circuit 2000 is enabled at time 16T22 and the AND gate 2912 is enabled at time 16T20.

The sum of the two operands, which are the contents of the Addend Register 2904 and the Augend Register 2908, is generated at the output terminals of the Index Adder 3407. This sum is gated from the index adder to the Index Adder Output Register 3401 at time OT6. The contents of the Index Adder Output Register 3401, i.e., the sum of the two operands, is gated to the Control Flip-Flops 5020 and 5413 and to the R index register, in this example the F Register 5801, via a path which includes the Mask and Complement Circuit 2000, the Masked Bus 2011, and AND gate 5800. The Mask and Complement Circuit 2000 is enabled at time OT8, while AND gate 5800 is enabled at time OT6. Input gates to the Control Flip-Flops 5020 and 5413 are enabled at time OT6 also.

AWRP

This is a special R class order which is completed only if the C sign flip-flop was reset by the preceding order. That is, in a sequence of orders the order preceding the order AWRP processes data which is examined to determine the sign thereof. If the sign of the word examined is positive the C Sign Flip-Flop 5413 is reset to its 0 state. The R combining order AWRP which follows is carried to completion (the sum of the two operands specified by the order is transferred to the designated index register) only if the C sign flip-flop was reset by the preceding order. If the C sign flip-flop was set, the designated index register is not modified.

This order specifies that the D–A field of the order is to be combined with the contents of the index register specified by bits 32, 33 and 34 of the order and if the C Sign Flip-Flop 5413 is set to its 0 state the sum of these operands is to be moved to the index register specified by bits 32, 33 and 34. The combining may take the form of adding the D–A field of the order with the contents of the index register specified by the order or the combining may comprise masking and/or complementing the contents of the index register specified by the order and the results added to the D–A field of the order.

The actions for this order occur within the timing framework of a single cycle order as depicted in FIG. 6. Where the two operands are to be added the 23 bit D–A field is gated from the output of the buffer order word register to the Addend Register 2904 via AND gate 2902 at time 10T14 during phase 2 of the indexing cycle. During phase 3 of the indexing cycle the contents of the specified index register are gated to the Augend Register 2908 via the Mask and Complement Circuit 2000. This transmission path includes the output AND gate associated with the specified index register, the Unmasked Bus 2014, the Masked Bus 2011, and AND gate 2913. AND gate 2913 is enabled at time 16T20.

The word which is moved from the specified index register to the Augend Register 2908 may be transmitted without modification or may be complemented and/or masked by the application of PL masking. Where PL masking is specified the Logic Register 2508 is set to a specified mask pattern by a preceding order word and as the contents of the specified index register are moved through the mask and complement circuit the appropriate portions of the Mask and Complement Circuit 2000 are enabled to accomplish the desired masking. That is, the contents of the logic register and the contents of the specified index register may be combined by "AND" masking.

The two operands, i.e., the contents of the Addend Register 2904 and the Augend Register 2908, are combined by addition in the Index Adder 3407 and transferred to the specified index register if the C Sign Flip-Flop 5413 was set to its 0 state.

CWR

This order specifies that the D–A field of the order is to be compared with the contents of the specified index register and the results of the comparison (the difference) gated to the Control Homogeneity Circuit 5000. The Control Sign Flip-Flop 5413 and the Control Homogeneity Flip-Flop 5020 are employed to summarize the homogeneity and sign of the word which was gated to the Control Homogeneity Circuit 5000.

The 23 bit D–A field of the order CWR is gated to the Addend Register 2904 during phase 2 of the indexing cycle unless PS masking is specified. If PS masking is specified, the D–A field is gated to the Logic Register 2508 and the Addend Register 2904 which was previously reset will contain plus zero.

The contents of the specified index register are complemented and gated to the Augend Register 2908 via the Mask and Complement Circuit 2000 during phase 3 of the indexing cycle, as described earlier herein. Complementing of this data is always performed and, in addition, AND masking may also be performed as an option. The Index Adder 3407 forms the sum of the operands which are found in the Addend Register 2904 and the Augend Register 2908. This sum is the complement of the desired "difference," i.e., (− contents of index register + D–A field). The "complement difference" formed in the Index Adder 3407 (during phase 1 of the execution cycle) is gated to the Index Adder Output Register 3401. The "complement difference" is complemented and gated to the Masked Bus 2011 via the Mask and Complement circuit 2000. This produces the desired "difference" (contents of index register − D A field) which is gated to the Control Homogeneity Circuit 5000 and to the Control Sign Flip-Flop 5413. The homogeneity of the Masked Bus 2011 as it appears at the output of the Control Homogeneity Circuit 5000 is gated to the Control Homogeneity Flip-Flop 5020. Subsequent decision orders may utilize the homogeneity and sign information placed into the Control Homogeneity Flip-Flop 5020 and the Control Sign Flip-Flop 5413 during the operational step of the order CWR.

We claim:

1. In combination:
a memory arrangement; and
a central control comprising:
means for reading information from said memory arrangement,
a multibit data register, and
a mask circuit connected to the input terminals of said data register,
said mask circuit comprising a plurality of gating circuits, one of said gating circuits being uniquely associated with each bit position of said data register, each of said gating circuits having input terminals connected to a data input source and to a masking input source corresponding to the associated bit position of said data register,
said gating circuits being arranged to insert data from said data sources only into the bit positions of said data register for which the corresponding masking input sources are enabled.

2. The combination in accordance with claim 3 wherein said central control further comprises in combination:
an instruction store;
a data store;
a central control responsive to program order words read from said instruction store and to data read from said data store;
a data buffer register system comprising a data buffer register, a plurality of auxiliary buffer register circuits, a data buffer register output bus connecting the output terminals of said data buffer register to said auxiliary buffer register circuits, and a data buffer register input bus connecting said auxiliary buffer register circuits to the input terminals of said data buffer register;
transmission means for transmitting data from said data store to said data buffer register; and
said central control comprising a common transmission bus, a logic register, and an insertion mask circuit for selectively transmitting information from said common transmission bus to particular bit positions of said data buffer register in accordance with the contents of said logic register.

3. The combination according to claim 2 wherein said insertion mask circuit includes means for transmitting to said data buffer register the information appearing on said common transmission bus at each bit position corresponding to a bit position of said logic register wherein a logical 1 occurs.

4. A telephone switching system comprising:
a plurality of communication paths;
a switching network for selectively interconnecting said communication paths;
a scanner system for scanning said communication paths and portions of said switching network;
a program store;
a call store;
a central control;
means in said central control for reading information from said program store;
means in said central control for reading information from said call store;
an unmasked bus;
a masked bus;
a mask circuit interposed between said unmasked bus and said masked bus;
a logic register connected to masking input terminals of said mask circuit;
a buffer register system comprising a data buffer register for receiving information read from said call store and for storing information to be transmitted to said call store;
a buffer register output bus;
a plurality of auxiliary buffer register circuits connected to said buffer register output bus;
a buffer register input bus connecting said auxiliary buffer register circuits to said buffer register;
means connecting said buffer register output bus to input terminals of said mask circuit; and
means responsive to said information read from said program store for generating control signals for said mask circuit.

5. In combination:
a memory containing sequences of program order words and data; and
a central control which generates control signals in response to execution of said order words and comprising:
means for reading information from said memory,
a plurality of flip-flops registers,
an unmasked bus connected to the output terminals of said flip-flop registers,
a masked bus connected to the input terminals of said flip-flop registers,
a mask circuit interposed between said unmasked bus and said masked bus having data input terminals, masking input terminals and data output terminals,
said mask circuit being responsive to said control signals for defining a particular logical operation to be performed in said mask circuit, said unmasked bus connected to said data input terminals of said mask circuit, the output terminals of one of said flip-flop registers connected to said masking input terminals, said data output terminals of said mask circuit connected to said masked bus, an order word register for storing certain of said information read from said memory, and a plurality of stages of said order word register being selectively connectable to the input terminals of said one of said flip-flop registers, 6. A data processor of a program controlled telephone switching system comprising:

a program store containing sequences of program order words and data words, said data words each comprising a first and a second portion;

said program store comprising a plurality of word locations each of said word locations containing $n$ bits of information;

a data store containing a plurality of data words each of said data words comprising $(n/2+m)$ bits;

a central control comprising means for generating commands for reading information from said program store and said data store;

said means including means for generating a binary word representative of a data word to be read from said program store;

translating means responsive to said binary word for generating commands for reading said data word from said program store; and instruction execution means in said central control responsive to a portion of said binary word for selectively processing therein a first or a second portion of said data word read from said program store.

7. A data processor of a program controlled telephone switching system comprising:

a program store having a plurality of $n$ bit memory locations, certain of said locations containing program order words, other of said locations containing data, said data comprising a first data base word, a second data base word, a plurality of data word prefix bits assignable to said first data base word in a first sequential order and assignable to said second data base word in the inverse order of said first sequential order;

means in said central control for generating commands for reading data from said program store; and means for selecting for processing said first data base word and said prefix bits and for selecting for processing said second data base word and said data prefix bits.

8. A data processor in accordance with claim 7 wherein said means for selecting comprises means for selecting any number of said prefix bits.

9. In combination:

a program store containing sequences of program order words, certain of said order words, including memory-accumulator combining orders, representing single cycle orders and other of said order words representing multicycle orders;

a data store; and a central control comprising;

means responsive to certain of said order words for generating code-addresses for reading information from said program store and from said data store, a plurality of registers including an accumulator register, a first accumulator input register, a second accumulator input register, means responsive to gating signals for transmitting the contents of said accumulator register to certain ones of said plurality of registers, accumulator input means for logically combining the contents of said first and said second input registers in accordance with input means control signals, decoder means responsive to said memory-accumulator combining orders for generating code-addresses for reading data words from said data store at a memory location specified in said memory-accumulator combining order, means for resetting said accumulator second input register, means for transmitting the contents of said accumulator register to said accumulator second input register, and means for generating said control signals for said input means and for generating said gating signals, and said last named means including an accumulator sequencer responsive to output signals of said decoder means for extending the data processing time for memory-accumulator combining orders beyond a period of time required to execute other single cycle orders and thereby extends the degree of operational overlap between a memory-accumulator combining order and a succeeding order.

10. The combination in accordance with claim 9 wherein said accumulator input means comprises means for providing at the output terminals thereof a data word which is:

a. the arithmetic sum of the contents of said first and said second accumulator input registers;

b. the logical AND of the contents of said first and said second accumulator input registers;

c. the logical OR of the contents of said first and said second accumulator input registers; and d. the EXCLUSIVE-OR of the contents of said first and said second accumulator input registers, said accumulator sequencer providing control signals to said accumulator input means to cause said input means to provide a selected one of a. through d. above.

11. The combination in accordance with claim 9 wherein said accumulator sequencer in response to output signals from said decoder means generates selected gating signals for gating output signals of said accumulator input means to a specified one of said certain registers.

12. In combination:

a program store containing sequences of program order words and system data, each of said order words comprising an instruction field and an N bit data field;

a data store containing a plurality of N bit data words; and a central control comprising;

means for obtaining information from said stores and for writing data into said data store, means for executing said sequences of program order words, a plurality of N bit flip-flop registers, data processing means for processing N bit data words, and means responsive to the execution of said sequences of program order words for generating control signals for controlling said data processing means.

13. In combination:

a memory system containing sequences of program order words and system data;

a central control comprising, means for generating commands for obtaining information from said memory system;

means for executing said sequences of program order words;

a plurality of flip-flop registers;

a data buffer register;

first transmission means interconnecting said memory system and said data buffer register for transmitting information obtained from said memory system to said data buffer register;

second transmission means for transmitting the contents of said data buffer register to a selected one of said flip-flop registers;

said second transmission means comprising an unmasked bus, a mask and complement circuit and a masked bus; and means for controlling said mask and complement circuit.

14. The combination in accordance with claim 13 wherein said memory system comprises a program store containing said sequences of program order words and certain of said data, and a data store containing other of said data, and wherein said transmission means interconnecting said memory system and said data buffer register comprises:

a. a data store response bus, and data store response selection gates interconnecting said data store and said data buffer register; and b. a program store response transmission bus, program store response selection gates, a buffer order word register, an index adder system, said mask and complement circuit, said masked bus, and gating means interposed between said masked bus and said data buffer register.

15. In combination:

a program store containing sequences of program order words and system data, said sequences of program order words including indexing order words;

a data store containing system data;

a central control comprising means for generating commands for obtaining information from said stores and to write information into said data store;

means for executing said sequences of program order words;

a data buffer register for storing information to be written into said data store and for receiving information read from said data store;

transmission means interconnecting said data store and said data buffer register;

a plurality of index registers including said data buffer register;

an index adder system comprising a plurality of input registers, an index adder and an index adder output register;

transmission and gating means interposed between said plurality of index registers and said input registers of said index adder system; and means responsive to said indexing program order words for generating control signals for gating the contents of a selected index register and a portion of said indexing order word to said index adder input registers and for controlling said index adder system.

16. A data processing system comprising a memory arrangement and a central processor, said central processor comprising:

an arithmetic logic unit;

a first data transfer bus connected to input terminals of said arithmetic logic unit;

a second data transfer bus connected to output terminals of said arithmetic logic unit;

a plurality of flip-flop registers having input terminals connected to said second data transfer bus and output terminals connected to said first data transfer bus;

a buffer register system comprising a data buffer register for buffering data communicated between said memory and said central processor;

a mask register; and an insertion mask circuit connected to input terminals of said data buffer register for selectively inserting data appearing on said second data transfer bus into bit positions of said data buffer register specified by the contents of said mask register.

17. A data processing system in accordance with claim 16 wherein said arithmetic logic unit comprises a plurality of logic gates for selectively combining the contents of said mask register and data appearing on said first data transfer bus.

18. In combination:

a memory containing sequences of program order words, certain of said order words comprising an instruction portion and an address portion; and a central processor comprising:

memory addressing means for reading information from said memory and writing information into said memory, a plurality of index registers, an index adder arrangement, and execution means responsive to the instruction portion of said certain order words to control the execution thereof and to selectively generate control signals for adding the contents of a specified one of said index registers to the address portion of said certain order words and to transmit the resulting data word to said specified index register and said memory addressing means.

19. In combination:

a memory arrangement containing sequences of program order words, certain of said order words including an instruction portion and an address portion; and a central processor comprising:

memory addressing means for obtaining information from said memory and for writing information into said memory, a plurality of index registers, and execution means responsive to the instruction portion of said certain order words to control the execution thereof and to transmit the address portion of said certain order words to said memory addressing means and to a specified one of said index registers.

UNITED STATES PATENT OFFICE

CERTIFICATE OF CORRECTION

Patent No. 3,569,939 Dated March 9, 1971

Inventor(s) A. H. Doblmaier, R. W. Downing, M. P. Fabisch, J. A. Harr, J. S. Nowak, F. F. Taylor, W. Ulrich It is certified that error appears in the above-identified patent and that said Letters Patent are hereby corrected as shown below:

Column 37, line 74, delete "The combination in accordance with claim 3 wherein said central control further comprises".

Column 37, line 75, "in" should read --In--.

Signed and Sealed this

*fifth* Day of *August 1975*

[SEAL]

*Attest:*

RUTH C. MASON
*Attesting Officer*

C. MARSHALL DANN
*Commissioner of Patents and Trademarks*